US009435990B2

(12) United States Patent
Cho et al.

(10) Patent No.: US 9,435,990 B2
(45) Date of Patent: Sep. 6, 2016

(54) UPRIGHT AND INVERTED MICROSCOPE

(71) Applicant: Echo Laboratories, Inc., San Diego, CA (US)

(72) Inventors: Eugene L. Cho, San Diego, CA (US); Ryan P. Talbot, San Diego, CA (US); Gregory J. Gemmen, San Diego, CA (US); Eric R. Garcia, Los Angeles, CA (US)

(73) Assignee: Echo Laboratories, Inc., San Diego, CA (US)

( * ) Notice: Subject to any disclaimer, the term of this patent is extended or adjusted under 35 U.S.C. 154(b) by 0 days.

(21) Appl. No.: 15/003,694

(22) Filed: Jan. 21, 2016

(65) Prior Publication Data

US 2016/0139393 A1    May 19, 2016

Related U.S. Application Data

(63) Continuation of application No. 14/832,694, filed on Aug. 21, 2015, which is a continuation of application No. 14/494,519, filed on Sep. 23, 2014, now Pat. No. 9,140,885, which is a continuation of application No. PCT/US2014/044707, filed on Jun. 27, 2014.

(60) Provisional application No. 61/841,229, filed on Jun. 28, 2013.

(51) Int. Cl.
| | |
|---|---|
| *G02B 21/26* | (2006.01) |
| *G02B 21/08* | (2006.01) |
| *G02B 21/02* | (2006.01) |
| *G02B 21/24* | (2006.01) |
| *G02B 21/00* | (2006.01) |
| *G02B 21/34* | (2006.01) |

(52) U.S. Cl.
CPC ........... *G02B 21/0088* (2013.01); *G02B 21/02* (2013.01); *G02B 21/26* (2013.01); *G02B 21/34* (2013.01)

(58) Field of Classification Search
CPC  G02B 21/0088; G02B 21/02; G02B 21/086; G02B 21/24; G02B 21/242; G02B 21/26; G02B 21/362
USPC ................................ 359/368, 382, 384, 363
See application file for complete search history.

(56) References Cited

U.S. PATENT DOCUMENTS

| | | | |
|---|---|---|---|
| 4,128,944 | A | 12/1978 | Stanton |
| 6,996,341 | B2 | 2/2006 | Hanzawa |
| 7,649,686 | B2 | 1/2010 | Harada |
| 2002/0080240 | A1 | 6/2002 | Omi |
| 2005/0219687 | A1 | 10/2005 | Aono |
| 2007/0146872 | A1 | 6/2007 | Bocher et al. |
| 2011/0292198 | A1 | 12/2011 | Lapstun |
| 2014/0168403 | A1 | 6/2014 | Winterot et al. |

FOREIGN PATENT DOCUMENTS

JP       2011027906 A     10/2011

OTHER PUBLICATIONS

International Search Report and Written Opinion mailed on Dec. 24, 2014 received in International Application No. PCT/US14/44707.

*Primary Examiner* — Frank Font
(74) *Attorney, Agent, or Firm* — Polsinelli PC

(57) ABSTRACT

A dual-configuration microscope is provided. The microscope may be converted into an upright configuration or an inverted configuration. The microscope includes a base. The microscope further includes a body having a first portion and a second portion, wherein the body is rotatably coupled to the base at a rotational coupling. The microscope further includes one or more objectives coupled to the first portion of the body, a condenser coupled to the second portion of the body and a stage positioned between the one or more objectives and the condenser. The stage includes a first specimen supporting surface and a second specimen supporting surface, wherein the second specimen supporting surface is positioned opposite the first specimen supporting surface.

12 Claims, 31 Drawing Sheets

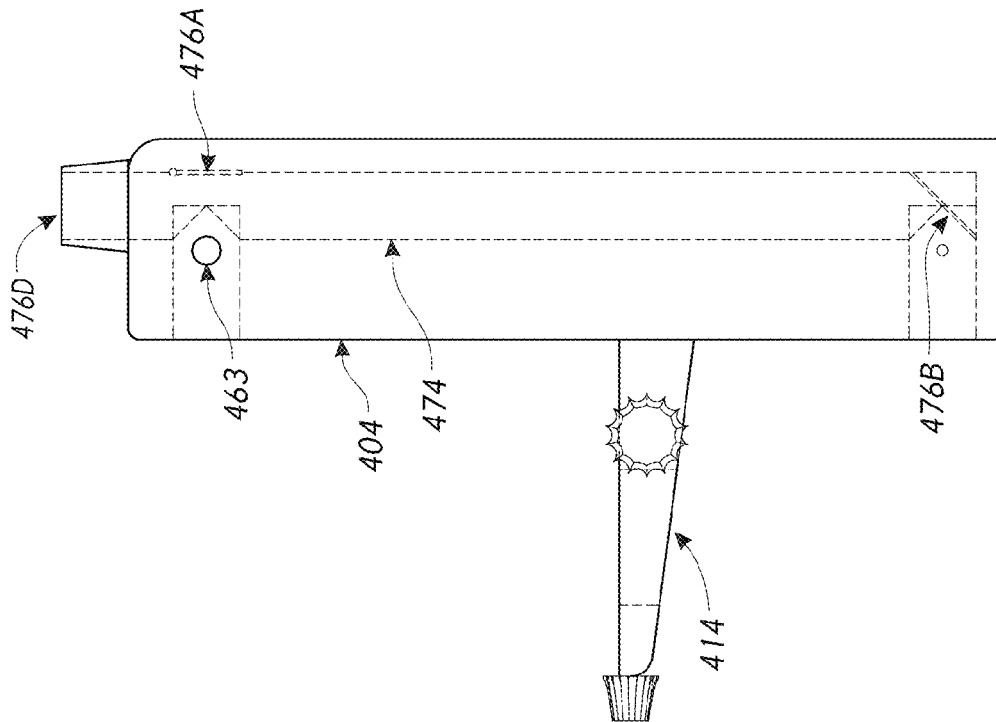
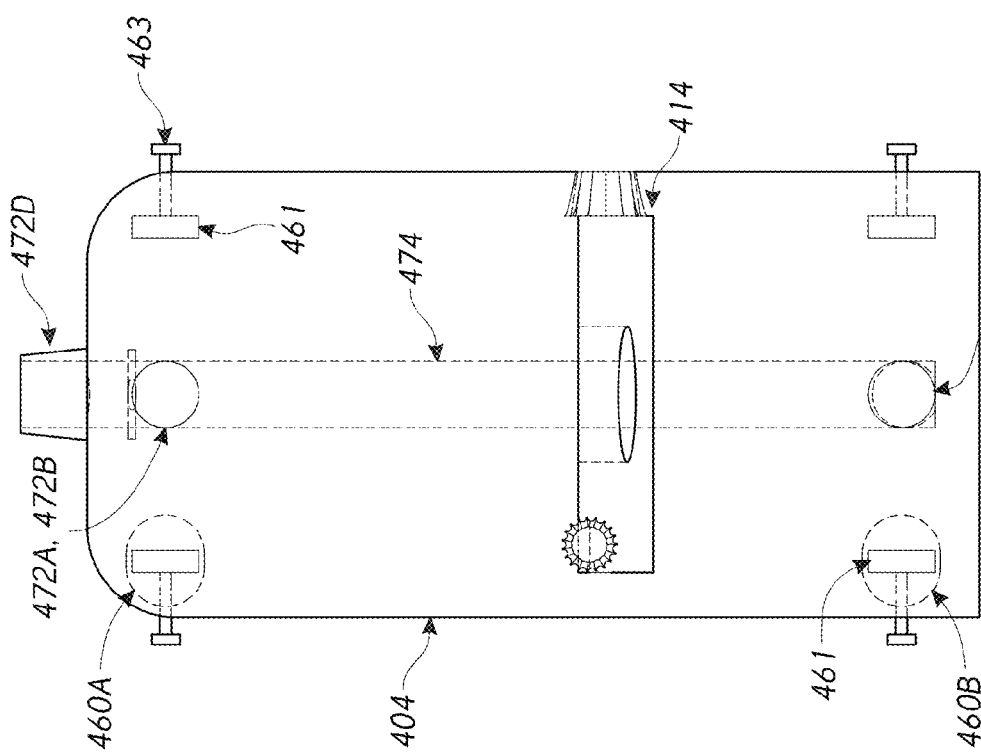
FIG. 13B
FIG. 13A

UPRIGHT AND INVERTED MICROSCOPE

CROSS-REFERENCE TO RELATED APPLICATIONS

This application is a continuation of non-provisional application Ser. No. 14/832,694, filed Aug. 21, 2015, which is a continuation of non-provisional application Ser. No. 14/494,519, filed Sep. 23, 2014, now U.S. Pat. No. 9,140,885, which is a continuation of International Application No. PCT/US2014/044707, filed Jun. 27, 2014, which claims priority to U.S. Provisional Patent Application Ser. No. 61/841,229, filed Jun. 28, 2013, the disclosures of which are incorporated herein by reference in their entirety.

TECHNICAL FIELD

The systems and methods disclosed herein generally relate to microscopes, and more particularly to a microscope configured to be used in both an upright configuration and an inverted configuration.

BACKGROUND

Conventionally, there are two types of microscope configurations, upright and inverted. Generally, upright and inverted microscopes differ in the manner by which a specimen, an objective, and a light source are arranged with respect to each other. For example, in an upright microscope, the objective is arranged so that it is disposed vertically above the specimen and the light source is disposed vertically below the specimen. In an inverted microscope, the objective is arranged so that it is disposed vertically below the specimen and the objective is disposed vertically above the specimen. Accordingly, an optic train, that is the arrangement of lenses generally housed within a housing and used to reflect light from the light source and specimen to a user, is arranged either above or below the specimen along with the objective.

In both upright and inverted microscopes, focusing of the specimen is accomplished by way of a corresponding positioning of the specimen relative to the objective, specifically in such a way that a region of the specimen to be observed is arranged in a focal plane of the objective. In one example, the position of the specimen relative to the objective may be adjusted by moving the objective along an optical axis relative to the specimen. In this case, the specimen may be mounted on a conventional specimen slide or dish that is secured to a corresponding specimen holder on a microscope stage. In this example, the microscope stage may be fixed such that it does not move in the direction of the optical axis of the objective. In another example, the position of the specimen relative to the objective may be adjusted by mechanically moving the stage along the optical axis in order to focus on the desired specimen region. In this example, the position of the objective would be fixed along the direction of its optical axis. In both examples, the stage may also be configured so that it may horizontally move relative to a microscope body along a single plane in at least two directions, such as in an X and a Y direction.

In both examples, focusing of the specimen region is usually performed by the user by operating an interface element arranged on the microscope body, as a result of which either the objective or the microscope stage is positioned along the optical axis. The interface element may comprise a rotary knob. Rotation of the rotary knob by the user causes linear motion of the objective or the stage along the optical axis. Typically, the rotary knob is arranged proximal to a working surface on which the microscope rests.

SUMMARY

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause, e.g., clause 1, 6 and 12. The other clauses can be presented in a similar manner.

1. A microscope comprising:
    a base;
    a body comprising a first portion and a second portion, wherein the body is rotatably coupled to the base at a rotational coupling;
    one or more objectives coupled to the first portion of the body;
    a condenser coupled to the second portion of the body;
    a stage positioned between the one or more objectives and the condenser, and comprising a first specimen supporting surface and a second specimen supporting surface, wherein the second specimen supporting surface is positioned opposite the first specimen supporting surface;
    wherein the one or more objectives, the condenser, and the stage are positioned in an inverted configuration when the body is positioned such that the one or more objectives is located below a light source and the second specimen supporting surface is oriented to support a specimen; and
    wherein the one or more objectives, the condenser, and the stage are positioned in an upright configuration when the body is positioned such that the one or more objectives is located above the light source and the first specimen supporting surface is oriented to support a specimen.

2. The microscope of clause 1, wherein the stage further comprises:
    a first specimen securing element coupled to the first specimen supporting surface; and
    a second specimen securing element coupled to the second specimen supporting surface.

3. The microscope of clause 1, wherein the first specimen supporting surface and the second specimen supporting surface both include a recessed pocket.

4. The microscope of clause 1 further comprising:
    a handle removably coupled to the stage, wherein the distal portion of the handle is configured to engage a first receptacle located on the first specimen supporting surface and a second receptacle located on the second specimen supporting surface.

5. The microscope of clause 4, wherein the handle is magnetically coupled to the stage.

6. A microscope system comprising:
    a body comprising a first portion and a second portion, wherein the body is rotatably coupled to a base at a rotational coupling, the rotational coupling defining a rotating axis;
    one or more objectives coupled to the first portion of the body;
    a condenser coupled to the second portion of the body; and a stage positioned between the one or more objectives and the condenser, and comprising a first specimen supporting surface and a second specimen supporting surface, wherein the second specimen supporting surface is positioned opposite the first specimen supporting surface.

7. The microscope system of clause 6, wherein the stage further comprises a first specimen securing element coupled to the first specimen supporting surface.

8. The microscope system of clause 6, wherein the stage further comprises a second specimen securing element coupled to the second specimen supporting surface.

9. The microscope system of clause 6, wherein the first specimen supporting surface includes a first recessed pocket.

10. The microscope system of clause 6, wherein the second specimen supporting surface includes a second recessed pocket.

11. The microscope system of clause 6 further comprising:
a handle removably coupled to the stage, wherein the distal portion of the handle is configured to engage a first receptacle located on the first specimen supporting surface and a second receptacle located on the second specimen supporting surface.

12. A method for assembling a rotating microscope, the method comprising:
coupling a microscope body to a microscope base at a rotational coupling, the microscope body configured to rotate about a rotating axis of the rotational coupling;
coupling one or more objectives to a first portion of the microscope body;
coupling a condenser to a second portion of the microscope body; and
mounting a stage between the one or more objectives and the condenser, the stage comprising a first specimen supporting surface and a second specimen supporting surface, wherein the first specimen supporting surface is positioned opposite the second specimen supporting surface.

Other configurations of the subject technology are apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIGS. 13A-13B illustrate an embodiment of a base of a modular microscope.

DETAILED DESCRIPTION

As discussed above, there conventionally are two types of microscope configurations, upright and inverted. These two types of microscopes are separate from one another and if a user desires to utilize an upright and inverted microscope, the user must have two separate microscopes at their disposal. Having two separate microscopes thereby increases the equipment and maintenance costs to the user and further, requires additional physical space to store and use the separate microscopes. The dual-configuration microscopes of the subject technology address the foregoing problems, among others, by allowing the user to convert a single microscope from an upright configuration into an inverted configuration, and vice versa.

Rotating Embodiment

Figure 1:
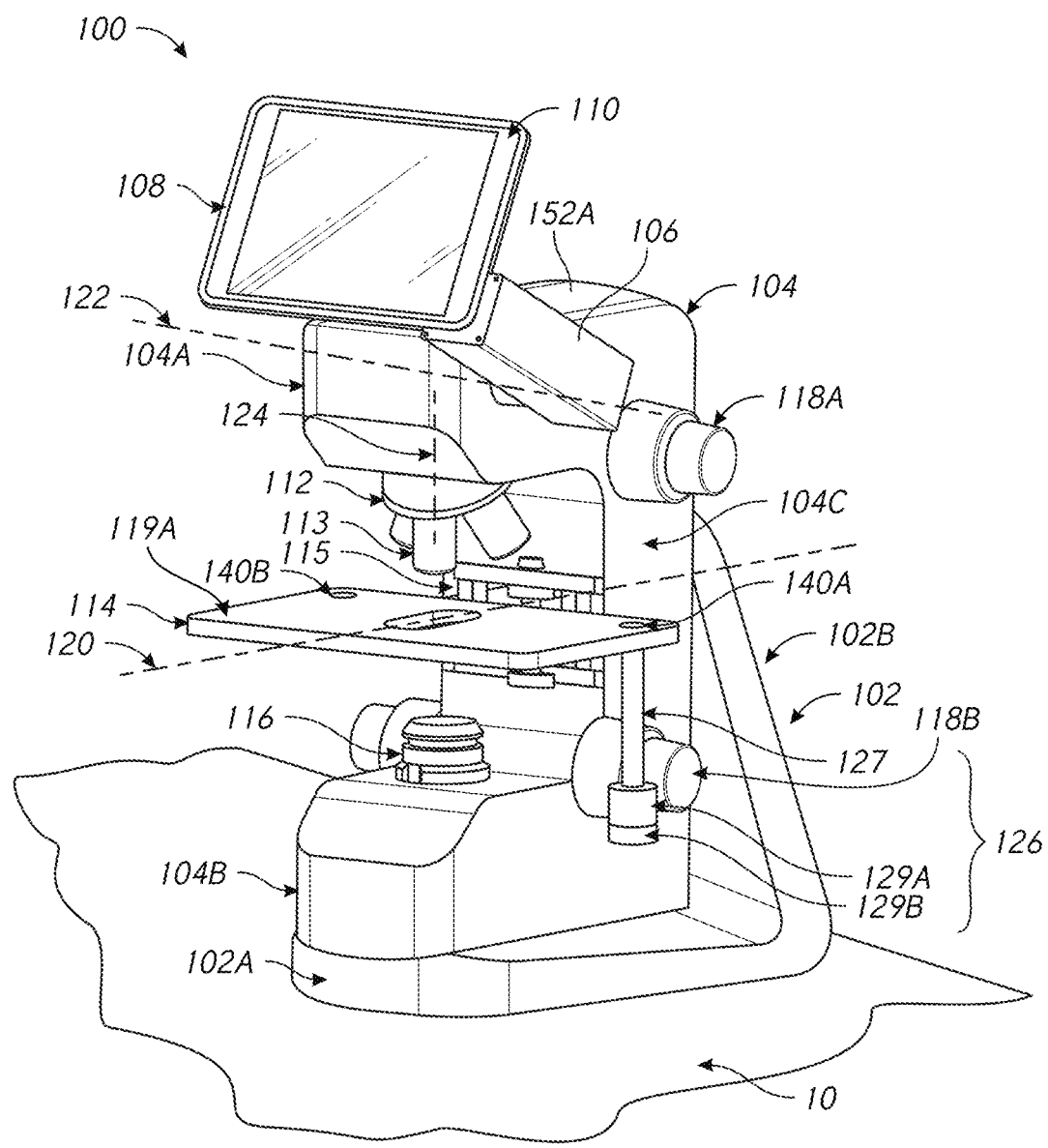
FIG. 1 illustrates an embodiment of a rotating microscope positioned in an upright configuration.

FIGS. 1-5 illustrate an example of a rotating microscope 100. Referring to FIG. 1, the microscope 100 is depicted in an upright configuration. The microscope 100 comprises a unitary base 102 and a body 104. The base 102 comprises a lower portion 102A and an upper portion 102B. The lower portion 102A extends in a substantially horizontal plane and the upper portion 102B extends in a substantially vertical plane. The upper portion 102B may be disposed at about a 90 degree angle from the lower portion 102A and may further, be manufactured as a single component. Alternatively, the lower portion 102A and upper portion 102B may be formed of two or more separate components and attached, fastened, or otherwise coupled together to form the base 102. The lower portion 102A is configured to support the microscope 100 on a working surface 10. The base 102 may be formed of a metal alloy, composite, polymer, or other sufficiently rigid material that is capable of supporting the weight and proper use of the microscope 100, as known by those having ordinary skill in the art.

Figure 2:
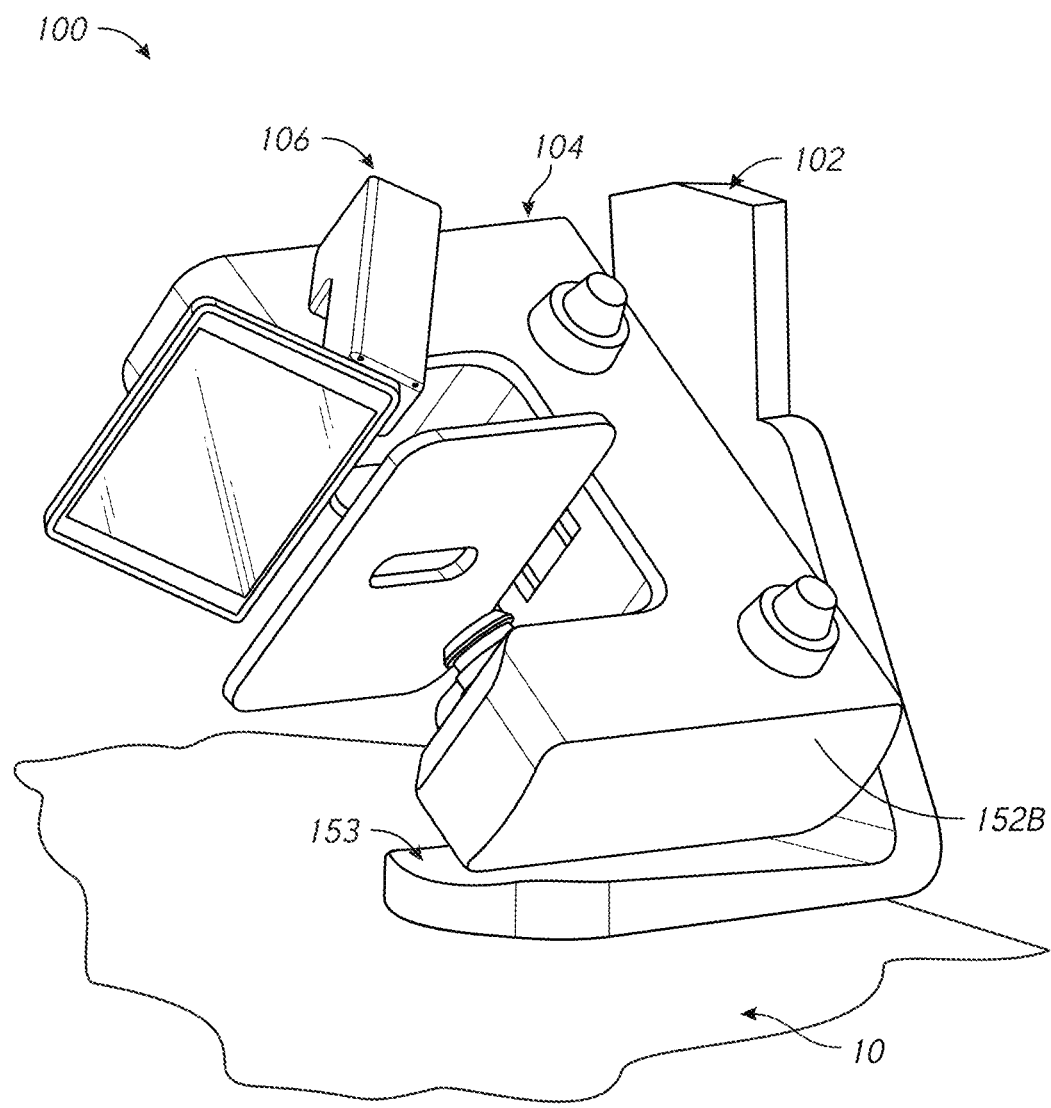
FIG. 2 illustrates an embodiment of a rotating microscope positioned in an example of an intermediate configuration.

The body 104 comprises a first portion 104A, a second portion 104B, and an intermediate portion 104C extending between the first and second portions, 104A and 104B respectively. The intermediate portion 104C may be rotatably coupled to the upper portion 102B of the base 102 at a rotational coupling (shown in FIG. 3A). The rotational coupling 130 allows the body 104 to rotate with respect to the base 102 along a rotating axis 120 that extends in a longitudinal direction with respect to the microscope 100, as shown in FIG. 2. To facilitate rotation of the body 104 with respect to the base 102, in some embodiments an outer surface 152A (see, for example, FIG. 1) of the first portion 104A and an outer surface 152B (see, for example, FIGS. 2 and 5) of the second portion 104B may each have a convex profile that corresponds to a concave profile of an outer surface 153 of the lower portion 102A. The convex and concave outer surfaces thereby prevent interference between the body 104 and the base 102 during rotation.

Figure 3A:
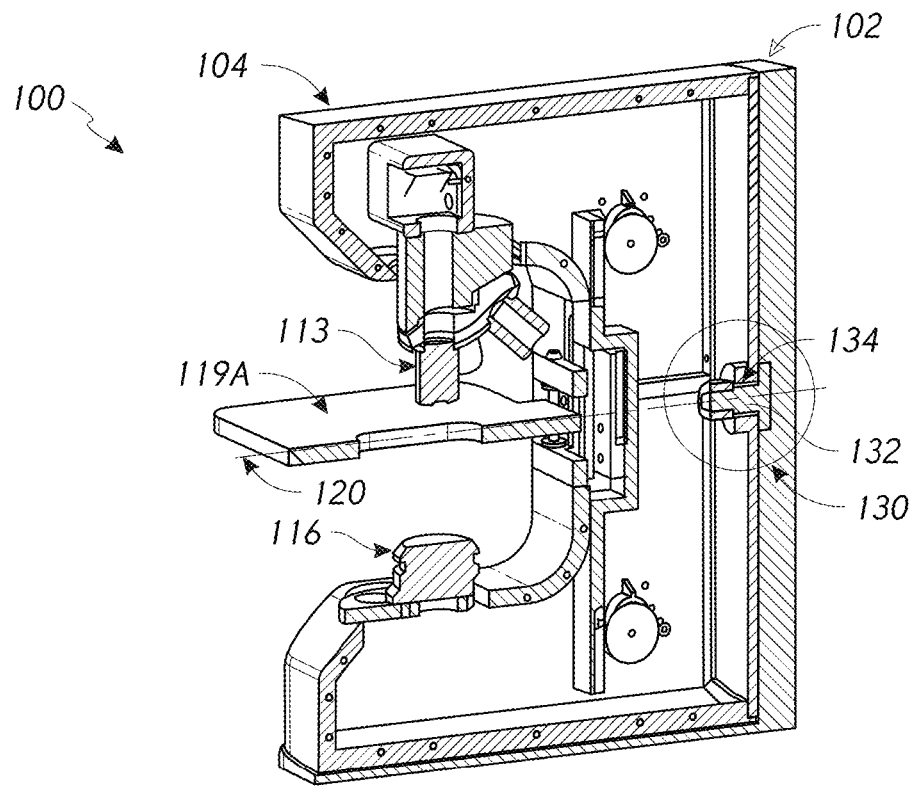
FIG. 3A illustrates a cross section view of an embodiment of a rotational coupling of a rotating microscope.

FIG. 3A illustrates a cross section view of one embodiment of the rotational coupling coupling 130 of the microscope 100. The rotational coupling 130 may comprise a shaft 132 extending longitudinally from the upper portion 102B of the base 102 and a corresponding bore 134 disposed within the intermediate portion 104C of the body 104. The shaft 132 and bore 134 are arranged to permit the body 104 to rotate about the rotating axis 120, as shown in FIG. 2.

The rotational coupling 130 is provided as one example of a suitable coupling between the base 102 and the body 104. In other embodiments, variations of rotational couplings from the illustrated coupling in FIG. 3A can be used to facilitate rotation of the body 104 around the rotating axis 120. For example, a ball bearing coupling, a rigid coupling between a first rotating shaft of the body 104 and a second rotating shaft of the base 102, a wheel and axle, or other suitable couplings allowing rotation may be used to permit rotation of the body 104 relative to the base 102. In some embodiments, the rotational coupling may be coated or treated to reduce friction. In some embodiments, the rotational coupling may be configured to stop or lock when the body 104 is in the inverted and upright positions.

Referring to FIG. 1, the body 104 is configured to support, directly or indirectly, at least one objective 113, a stage 114, a condenser 116, and/or a light source (not shown). The body 104 may be formed of a metal alloy, composite, polymer, or other sufficiently rigid material capable of supporting the objective 113, stage 114, condenser 116, and/or light source.

The body 104 may be manufactured as a single component or may comprise a multitude of components that are attached, fastened, or otherwise assembled together, as known by those having ordinary skill in the art.

The objective 113 may be mounted to a nosepiece 112 and is disposed proximal to the first portion 104A of the body 104. The objective 113 comprises a cylinder containing one or more lenses configured to collect light from a specimen being observed. The objective 113 further defines an optical axis 124 that, when in a working position, runs perpendicular to the stage 114. The stage 114 supports the specimen being observed on a specimen supporting surface 119A, as discussed further below.

The condenser 116 and light source may be disposed proximal to the second portion 104B of the body 104. Particularly, the condenser 116 may be mounted on the second portion 104B and the light source may be mounted within the body 104. The condenser 116 includes a lens that serves to concentrate light from the light source into a cone of light that illuminates the specimen.

The stage 114 is a platform configured to support the specimen being observed. The stage 114 may include an opening aligned with the condenser 116, to allow light to pass through the stage 114 and illuminate the specimen. In one example, the stage 114 may be configured to be removably attached to the intermediate portion 104C of the body 104. For example, the stage 114 may include a substantially horizontal rail that is configured to slide within a substantially horizontal channel disposed within the intermediate portion 104C of the body 104. The stage 114 may thus, be attached to the body 104 by sliding the stage 114 horizontally toward the body 104. To remove the stage 114, the stage 114 may be slid horizontally away from the body 104, thereby disengaging the channel and rail assembly. In this example, the channel of the body 104 is configured to receive the rail of the stage 114 when the microscope 100 is in either the upright or inverted configuration. Accordingly, the channel of the body 104 and the rail of the stage 114 may have horizontally symmetrical profiles, such as a round, oval, rectangular, square or any combination thereof.

In another example, the rail of the stage 114 may be configured to be inserted into a first or second substantially horizontal channel disposed within the intermediate portion 104C of the body 104. In this example, the rail of the stage 114 may be inserted into the first channel of the body 104 when the microscope 100 is in the upright configuration and into the second channel of the body 104 when the microscope 100 is in the inverted configuration. In some embodiments, the first and second channels of the body 104 and the rail of the stage 114 may not have horizontally symmetrical profiles in order to aid the user in knowing into which of the first or second channels to insert the rail of the stage 114. In some embodiments, the first and second channels of the body 104 can be arranged to maintain a distance between a specimen supporting surface 119A of the stage 114 and an outer surface of a lens of the objective 113, regardless of whether the microscope 100 is in the upright or inverted configuration. In particular, when the microscope 100 is in the upright configuration, the stage 114 can be inserted into the first channel. When in the first channel, the specimen supporting surface 119A is at a first distance away from the outer surface of the lens of the objective 113. When the microscope 100 is in the inverted configuration, the stage 114 can be inserted into the second channel. When in the second channel, the specimen supporting surface 119A is at a second distance away from the outer surface of the lens of the objective 113. The first and second channels are arranged on the body 104 so that the first and second distances are the same.

Alternatively, the stage 114 may be mounted to a height compensator 115 that is disposed proximal to the intermediate portion 104C of the body 104. As shown in FIG. 1, the stage 114 may be disposed between the objective 113 and the condenser 116. Other embodiments of stage configurations are discussed in more detail below.

Figure 4A:
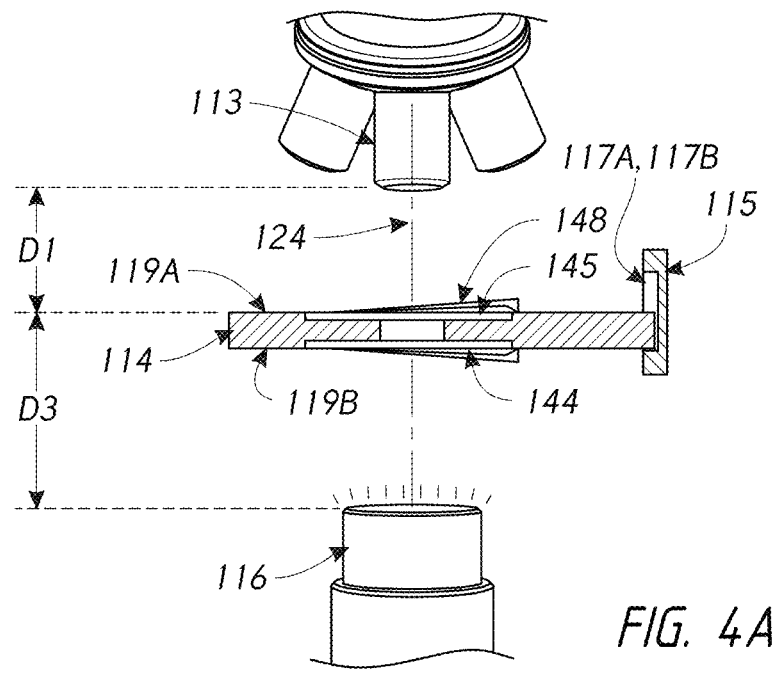
FIG. 4A illustrates an embodiment of a height compensator in a first position.
Figure 4B:
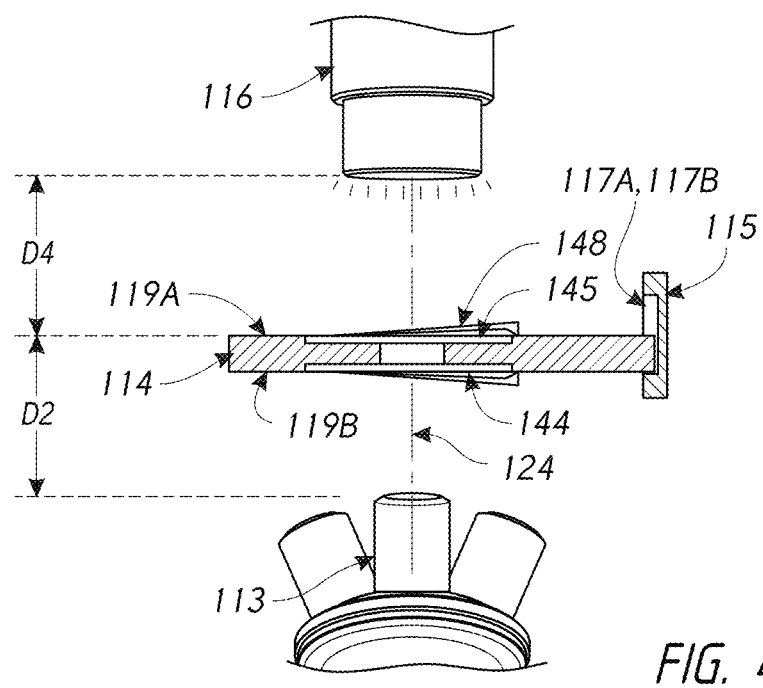
FIG. 4B illustrates an embodiment of the height compensator of FIG. 4A in a second position.

FIGS. 4A and 4B illustrate a detail view of the height compensator 115 and the stage 114 in the first and second positions, respectively. The height compensator 115 may comprise at least one rail 117A that is configured to engage a corresponding channel 117B disposed within the stage 114. The rail 117A and the channel 117B are configured to permit the stage 114 to slide between a first position (shown in FIG. 4A) and a second position (shown in FIG. 4B) along the optical axis 124. Although a rail and channel arrangement are shown in FIGS. 4A and 4B, it is known by those having ordinary skill in the art that other mechanisms may be used to permit sliding of the stage between the first and second positions.

Figure 5:
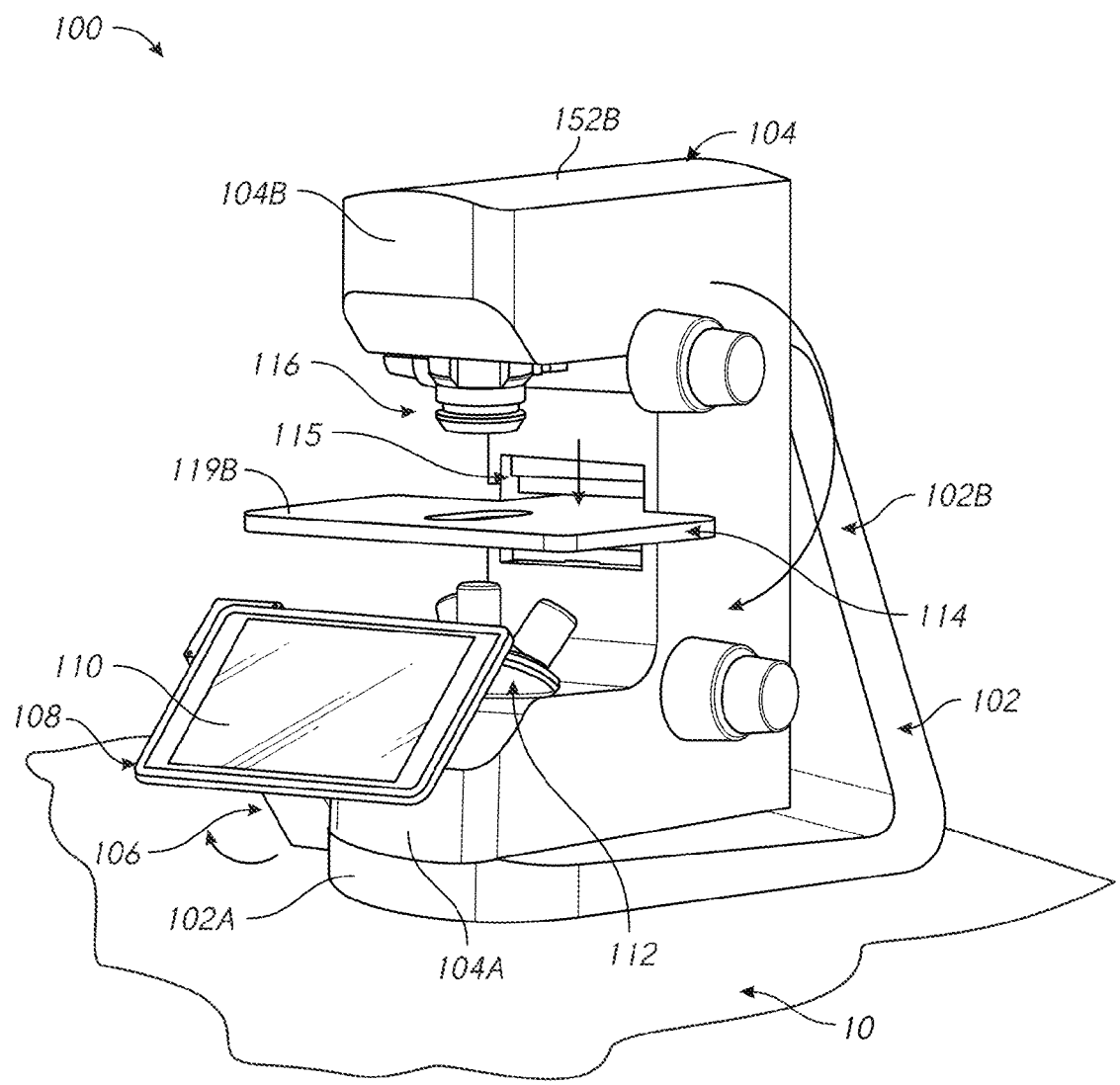
FIG. 5 illustrates an embodiment of a rotating microscope positioned in an inverted configuration.

When the stage is in the first position (shown in FIG. 4A), the microscope 100 is in the upright configuration (as shown in FIG. 1). When the stage is in the second position (shown in FIG. 4B), the microscope is in the inverted configuration (as shown in FIG. 5). In one embodiment, the stage 114 slides between the first and second positions based on gravity. Accordingly, the stage 114 may move between the first and second positions automatically when the body 104 is rotated from the upright configuration to the inverted configuration. Similarly, the stage 114 may move between the second and first positions automatically when the body 104 is rotated from the inverted configuration to the upright configuration. Movement of the stage between the first and second position can maintain a focal distance between the objective and the specimen-supporting (e.g., upward-facing) surface of the stage when the body 104 is rotated between the inverted configuration and the upright configuration. Similarly, movement of the stage between the first and second position can maintain a working distance between the condenser and the specimen-supporting (e.g., upward-facing) surface of the stage when the body 104 is rotated between the inverted configuration and the upright configuration.

In some aspects, the stage 114 comprises, on an outer surface, a first specimen supporting surface 119A and at an opposite surface, a second specimen supporting surface 119B. When the microscope 100 is in the upright configuration and thus, the stage 114 is in the first position, the first specimen supporting surface 119A is facing upward and therefore configured to support the specimen. When the microscope 100 is in the inverted configuration and thus, the stage 114 is in the second position, the second specimen supporting surface 119B is facing upward and therefore configured to support the specimen.

In some aspects, each of the first and second specimen supporting surfaces, 119A and 119B respectively, may comprise a specimen securing element 143 that is configured to secure a specimen. The specimen securing element 143 may secure the specimen through mechanical, magnetic, or electromechanical means. For example, the specimen securing element 143 may comprise stage clips to mechanically secure the specimen to the stage. Alternatively, each of the first and second specimen supporting surfaces, 119A and 119B respectively, may comprise a recessed pocket 144 that is configured to accept an interchangeable insert 145. The interchangeable insert 145 may be selected based on the type of specimen to be observed, such as a specimen slide or specimen petri dish. In this example, the interchangeable insert 145 itself, supports the specimen.

In some aspects, when the stage 114 is in the first position, the first specimen supporting surface 119A is positioned at a distance "D1" from an outer surface of a lens of the objective 113 and a distance "D3" from an outer surface of the condenser 116. Likewise, when the stage 114 is in the second position, the second specimen supporting surface 119B is positioned at a distance "D2" from the outer surface of the lens of the objective 113 and a distance "D4" from an outer surface of the condenser 116. To maintain the appropriate distance between the specimen supporting surface and the lens of the objective 113 and/or condenser 116, the height compensator 115 allows the stage 114 to move between the first and second positions, as discussed above. By doing so, the height compensator 115 allows D2 to be the same value as D1 when the microscope 100 is converted from the upright configuration to the inverted configuration. Likewise, the height compensator 115 allows D1 to be the same value as D2 when the microscope 100 is converted from the inverted configuration to the upright configuration. Similarly, the height compensator 115 allows D3 to be the same value as D4 when the microscope 100 is converted from the upright configuration to the inverted configuration. Likewise, the height compensator 115 allows D4 to be the same value as D3 when the microscope 100 is converted from the inverted configuration to the upright configuration. In other words, the height compensator 115 maintains the distance (D1 or D2) between the appropriate specimen supporting surface (119A or 119B) and the lens of the objective 113, and/or the distance (D3 or D4) between the appropriate specimen supporting surface (119A or 119B) and the lens of the condenser 116, regardless of whether the microscope 100 is in the upright configuration or the inverted configuration. Accordingly, the position of a focal plane of the objective 113, with respect to the appropriate specimen supporting surface (119A or 119B), remains unchanged. Likewise, the position of the condenser 116, with respect to the appropriate specimen supporting surface (119A or 119B)—the distance of which is generally referred to as the working distance—remains unchanged.

Figure 3B:
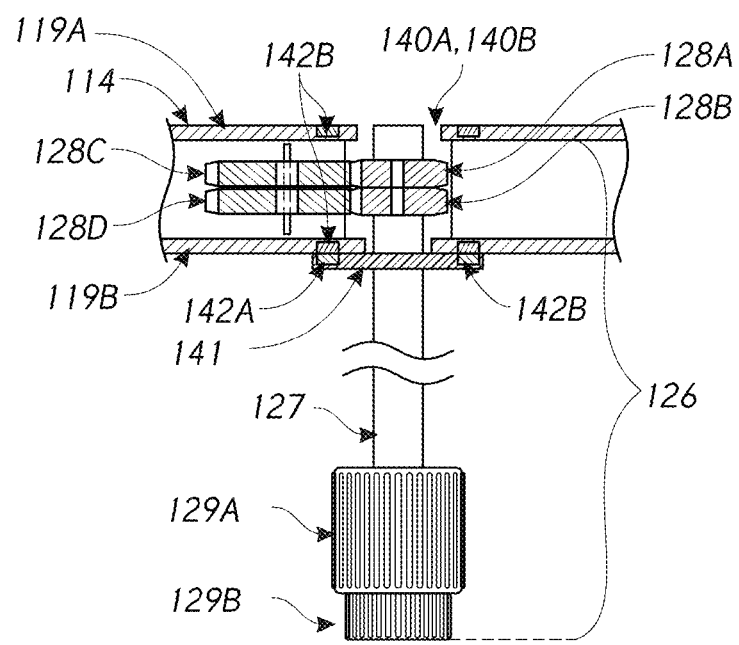
FIG. 3B illustrates a cross section view of an embodiment of a stage.

FIG. 3B illustrates a cross section view of the stage 114. In some aspects, the stage 114 comprises a removable and repositionable stage displacement handle 126. Rotation of the handle causes the displacement of the stage 114 in the X and Y directions, both of which are generally horizontal and parallel to the working surface 10 that supports the microscope 100. The handle 126 comprises a shaft 127 having a first gear 128A and a second gear 128B disposed at a distal portion of the shaft 127, and a first knob 129A and a second knob 129B disposed at a proximal portion of the shaft 127. Rotation of the first knob 129A causes rotation of the first gear 128A. Rotation of the first gear 128A causes displacement of the stage 114 in the X direction. Rotation of the second knob 129B causes rotation of the second gear 128B. Rotation of the second gear 128B causes displacement of the stage 114 in the Y direction.

The stage 114 further comprises at least one receptacle 140A configured to receive the distal portion of the shaft 127 and the first and second gears, 128A and 128B, respectively. In one aspect, the receptacle 140A is configured to receive the distal portion of the shaft 127 from either the first or second specimen supporting surfaces 119A, 119B. In other words, the distal portion of shaft 127 may be inserted into the receptacle 140A from either the first specimen supporting surface 119A side, or the second specimen supporting surface 119B side. In this way, when the microscope 100 is rotated from the upright configuration to the inverted configuration, the handle 126 may be removed from the receptacle 140A, such as from the second specimen supporting surface 119B side, and reinserted into the receptacle 140A from the first specimen supporting surface 119A side, thereby repositioning the handle 126 so that it remains proximal to the working surface 10 that supports the microscope 100. Similarly, when the microscope 100 is rotated from the inverted configuration to upright configuration, the handle 126 may be removed from the receptacle 140A, such as from the first specimen supporting surface 119A side, and reinserted into the receptacle 140A from the second specimen supporting surface 119B side, thereby repositioning the handle 126 so that it remains proximal to the working surface 10 that supports the microscope 100.

In some aspects, the stage 114 may include a second receptacle 140B that is disposed laterally away from the first receptacle 140A. Upon conversion of the microscope 100 from the upright configuration to the inverted configuration, the handle 126 may, for example, be removed from the first receptacle 140A and inserted into the second receptacle 140B, thereby allowing the handle 126 to remain on the right side of the microscope 100. Accordingly, the first and second receptacles, 140A and 140B respectively, provide for the handle 126 to remain on a common side of the microscope 100, regardless of whether the microscope 100 is in the upright configuration or in the inverted configuration.

Referring to FIG. 3B, upon insertion of the handle 126 into the receptacle 140A, 140B the first gear 128A engages a corresponding third gear 128C disposed within the stage 114 and the second gear 128B engages a corresponding fourth gear 128D disposed within the stage 114. Although the use of gears are discussed herein with reference to displacing the stage 114 in the X and Y directions, it is understood that other mechanical methods may be used to control the displacement of the stage in the X and Y directions, such as the use of hexagonal shaped shafts, square shaped shafts, use of friction or snap fits, or any other mechanical methods as known by those having ordinary skill in the art.

The handle 126 may further comprise a stop 141 that is configured to engage the first or second specimen supporting surfaces 119A, 119B. When engaged, the physical contact between the stop 141 and the first or second specimen supporting surfaces 119A, 119B prevents further insertion of the handle 126 into the receptacle 140A, 140B by mechanically preventing further movement of the handle 126 in a direction toward the stage 114. In some aspects, to prevent the handle 126 from inadvertently disengaging the receptacle 140A, 140B the handle 126 may comprise a magnetic element 142A that is configured to engage one or more corresponding magnetic elements 142B disposed within the stage 114. In particular, the magnetic elements 142B may be disposed proximate to the first and second specimen supporting surfaces, 119A and 119B respectively. The magnetic elements 142A, 142B maintain engagement of the shaft 127 within the receptacle 140A, 140B through a magnetic force acting between the magnetic elements 142A and 142B. Although the use of a magnetic force is discussed herein with reference to maintaining the shaft 127 within the receptacle 140A, 140B, it is understood that other methods may be used to maintain the shaft 127 within the receptacle 140A, 140B, such as the use of interference, friction or snap fits, or any other mechanical or electromechanical methods as known by those having ordinary skill in the art.

Referring to FIG. 1, the microscope 100 may further comprise an optical arm 106 disposed proximal to the first portion 104A of the body 104. The optical arm 106 may comprise an elongated housing forming an optical pathway therein, the optical pathway having an optical input at one end of the optical arm 106 and an optical output at an opposite end of the optical arm 106. The optical input of the of the optical arm 106 is configured to receive light that has entered the objective 113 and has been reflected toward the optical input of the optical arm 106 via one or more mirrors disposed within the first portion 104A of the body 104. Light entering the optical input of the optical arm 106 is then reflected to the optical output of the optical arm 106 via one or more mirrors disposed within the optical arm 106 and/or body 104. The optical arm 106, therefore, forms a portion of the optical path of the microscope 100.

In another example, the optical arm 106 may be disposed proximal to the intermediate portion 104C of the body 104. In this example, the optical arm 106 may be disposed adjacent to the stage 114 and configured to direct light entering the objective to the optical output of the optical arm 106 via one or more mirrors disposed within the optical arm 106 and/or body 104. In yet another example, the optical arm 106 may be disposed proximal to the second portion 104B of the body 104. In this example, the optical arm 106 may be disposed adjacent to the working surface 10 and configured to direct light entering the objective to the optical output of the optical arm 106 via one or more mirrors disposed within the optical arm 106 and/or body 104.

In some aspects, the optical arm 106 may be pivotably coupled to the first portion 104A of the body 104, thereby allowing the optical arm 106 to rotate about a pivoting axis 122. The pivoting axis 122 may extend in a lateral direction with respect to the microscope 100. The optical arm 106 may be configured to be positioned at varying angles, or at one or more predetermined angles. In one aspect, the optical arm 106 may be mechanically connected to a brake that prevents the body 104 from rotating. Accordingly, in order to rotate the body 104 and thereby convert the microscope 100 from an upright configuration to an inverted configuration, or from an inverted configuration to an upright configuration, the optical arm 106 must first be rotated towards the rotating axis 120 or toward the stage 114 in order to disengage the brake. In this way, the possibility of damaging the optical arm 106 or other related component through inadvertent collision with the lower portion 102A during rotation of the body 104, is reduced because the optical arm 106 is moved toward the rotating axis 120 and away from the lower base 102A, as shown in FIG. 2.

Referring to FIG. 1, in some aspects the microscope 100 may further comprise a cradle 108 disposed at a distal portion of the optical arm 106 and proximal to the optical output of the optical arm 106. The cradle 108 is configured to receive and secure an electronic device 110 that is capable of acquiring images. Particularly, the cradle 108 aligns an optical input of the electronic device 110, such as a lens of a camera, with the optical output of the optical arm 106. The electronic device may comprise a mobile device, camera, tablet computer, laptop computer, PDA, portable computer, or other device that is capable of receiving light or other optical data, or acquiring an image.

The electronic device 110 may further comprise a touch-sensitive screen display or other input mechanisms, such as buttons or keys, that are capable of receiving user input. In some aspects, a user may control operations of the microscope, such as focusing of a specimen, positioning of a specimen with respect to the objective 113, operation of the light source, control of the condenser 116, acquisition of an image, processing of an image, sending of an image to another device, altering light pathways and illumination settings, automated X-Y stage movement, controlling external hardware devices (e.g., camera), controlling other computer devices (e.g., onboard mini-computer, onboard controllers), communicating with other devices (such as through local area networks, wide area networks, broadband, Bluetooth, WiFi, or other wireless or wired communication methods), and other microscope related operations, by using the input mechanisms of the electronic device 110.

The microscope 100 may further comprise a first and second focus knob 118A, 118B disposed laterally on the body 104. The first focus knob 118A may be disposed proximal to the first portion 104A of the body 104 and the second focus knob 118B may be disposed proximal to the second portion 104B of the body 104. The first and second focus knobs 118A, 118B may be configured to adjust a position of the objective 113 along the optical axis 124 to thereby position the specimen in a focal plane of the objective 113. Alternatively, the first and second focus knobs 118A, 118B may be configured to adjust a position of the height compensator 115 and stage 114, together, along the optical axis 124 to thereby position the specimen in a focal plane of the objective 113.

A method for converting the microscope 100 from an upright configuration into an inverted configuration will now be discussed with reference to FIGS. 1-5. To convert the microscope 100 from the upright configuration into the inverted configuration, the user may first rotate the optical arm 106 toward the stage 114. Rotation of the optical arm 106 towards the stage 114 may cause the brake to disengage, thereby allowing the body 104 to rotate about the rotating axis 120. Alternatively, the optical arm 106 may be configured to rotate towards the stage 114 upon rotation of the body 104. Rotating the optical arm 106 towards the stage 114 during rotation of the body 104 minimizes the likelihood that the optical arm 106 will be damaged during conversion of the microscope 100. The optical arm 106 may be configured to automatically rotate towards the stage 114 by, for example, mechanically coupling the optical arm 106 to the rotational coupling 130 via a cable and pulley system. In this example, upon rotation of the body 104, the cable is placed in tension thereby causing the optical arm 106 to rotate towards the stage 114. In another example, a stepper motor or solenoid may be coupled to the optical arm 106 and configured to actuate the optical arm 106 towards the stage 114 upon sensing rotation of the body 104.

The user may then rotate the body 104 with respect to the base 102 in either a clockwise or counterclockwise direction along the rotating axis 120, as shown in FIG. 2. The body 104 is rotated until the first portion 104A is adjacent to the lower portion 102A, as shown in FIG. 5. As illustrated by FIG. 2 and FIG. 5, the body of the microscope occupies substantially the same three-dimensional area in the inverted configuration and in the upright configuration, and faces substantially the same direction in the inverted configuration and in the upright configuration. In the inverted configuration, the objective occupies substantially the same space as the condenser occupies in the upright configuration. Similarly, in the inverted configuration, the condenser occupies substantially the same space as the objective occupies in the upright configuration. This can provide a seamless user experience when converting the microscope between the upright and inverted configurations, as the microscope occupies substantially the same space above the workspace upon which the microscope is placed in both configurations, and also faces the same direction in both configurations.

As the body 104 is rotated from the upright configuration into the inverted configuration, the stage 114 may automatically slide from the first position (as shown in FIG. 4A), to the second position (as shown in FIG. 4B), in a direction along the optical axis 124. As a result, referring to FIGS. 4A and 4B, the distance between the specimen supporting surface (119A and 119B) and the outer surface of the lens of the objective 113 is maintained. In other words, the distance D2 is the same as the distance D1.

The user may then rotate the optical arm 106 along the pivoting axis 122 to attain a desirable viewing angle. In some aspects, to prevent the body 104 from inadvertently moving or otherwise rotating with respect to the base 102, the body 104 may be fixed, secured, or otherwise prevented from moving by either mechanically, electromechanically, or electrically locking the body 104 in the second, inverted configuration. For example, as discussed above, the body 104 may be fixed in the inverted configuration by activating the brake. The brake may be activated manually by the user or automatically through the use of a controller which is configured to detect the position of the upper or lower portions 104A, 104B of the body 104. When the upper or lower portions 104A, 104B of the body 104 are adjacent to the lower portion 102B of the base 102, the controller activates the brake thereby fixing the body 104 in the inverted configuration. The brake may comprise a solenoid, magnetic, electrical, or mechanical brake. Alternatively, a pin may be engaged to lock the body 104 to the base 102 in the inverted configuration.

The user may further remove the handle 126 from either the first or second receptacle 140A, 140B and reinsert the handle 126 in the other receptacle 140A, 140B, as desired. The handle 126 may also be inserted into the desired receptacle 140A, 140B from either side of the first or second specimen supporting surfaces 119A, 119B. Accordingly, the handle may be arranged so that its position with respect to the user, remains the same (e.g., lower right side of the microscope 100, lower left side of the microscope 100, upper right side of the microscope 100, or upper left side of the microscope 100).

Once in the inverted configuration, the user may wish to rotate the nose piece 112 in order to utilize a different objective 113. In one aspect, in order to allow the nose piece 112 to freely rotate with sufficient clearance from the stage 114, the stage 114 may be moved from the second position (shown in FIG. 4B) to the first position (shown in FIG. 4A). In one example, the stage 114 may be moved into the first position by the user. In this example, the stage may be mechanically linked to a lever disposed on a sidewall of the body. By manipulating the lever, the stage 114 may be moved into the first position. In another example, the nosepiece 112 may be mechanically coupled to the stage 114 such that rotation of the nose piece 112 causes the stage 114 to move toward the first position. In this example, the nosepiece 112 may be coupled to a rack and pinion mechanism that converts the rotational movement of the nosepiece into a linear displacement of the stage 114. In yet another example, the stage may be coupled to a solenoid that is actuated when rotation of the nosepiece 112 is detected. In this example, a controller senses rotation of the nosepiece 112 which in turn causes a signal to be sent to an actuator, such as the solenoid, to thereby actuate the stage 114 away from the objective and into the first position.

A method for converting the microscope 100 from the inverted configuration into the upright configuration will now be discussed with reference to FIGS. 1-5. To convert the microscope 100 from the inverted configuration into the upright configuration, the user may first disengage the brake thereby allowing the body 104 to rotate about the rotating axis 120.

The user may then rotate the body 104 with respect to the base 102 in either a clockwise or counterclockwise direction along the rotating axis 120, as shown in FIG. 2. The body 104 is rotated until the second portion 104B is adjacent to the lower portion 102A, as shown in FIG. 1.

As the body 104 is rotated from the inverted configuration into the upright configuration, the stage 114 may automatically slide from the second position (as shown in FIG. 4B), to the first position (as shown in FIG. 4A), in a direction along the optical axis 124. As a result, referring to FIGS. 4A and 4B, the distance between the specimen supporting surface (119A and 119B) and the outer surface of the lens of the objective 113 is maintained. In other words, the distance D1 is the same as the distance D2.

The user may then rotate the optical arm 106 along the pivoting axis 122 to attain a desirable viewing angle. In some aspects, to prevent the body 104 from inadvertently moving or otherwise rotating with respect to the base 102, the body 104 may be locked in the first inverted configuration, as discussed above.

The user may further remove the handle 126 from either the first or second receptacle 140A, 140B and reinsert the handle 126 in the other receptacle 140A, 140B, as desired. The handle 126 may also be inserted into the desired receptacle 140A, 140B from either side of the first or second specimen supporting surfaces 119A, 119B. Accordingly, the handle may be arranged so that its position with respect to the user, remains the same (e.g., lower right side of the microscope 100, lower left side of the microscope 100, upper right side of the microscope 100, or upper left side of the microscope 100).

Flipping Embodiment

Figure 6:
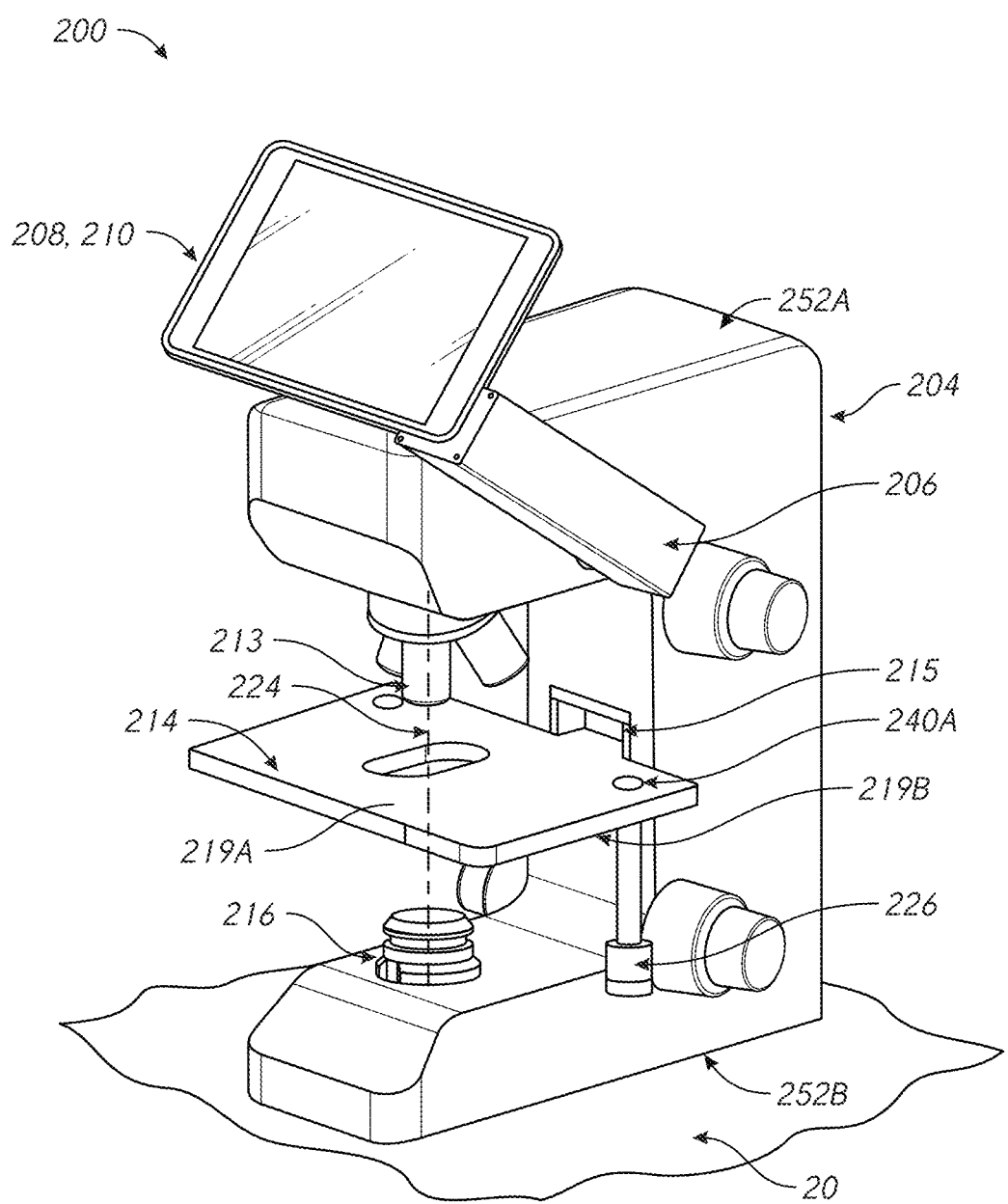
FIG. 6 illustrates an embodiment of a flipping microscope in an upright configuration.
Figure 7:
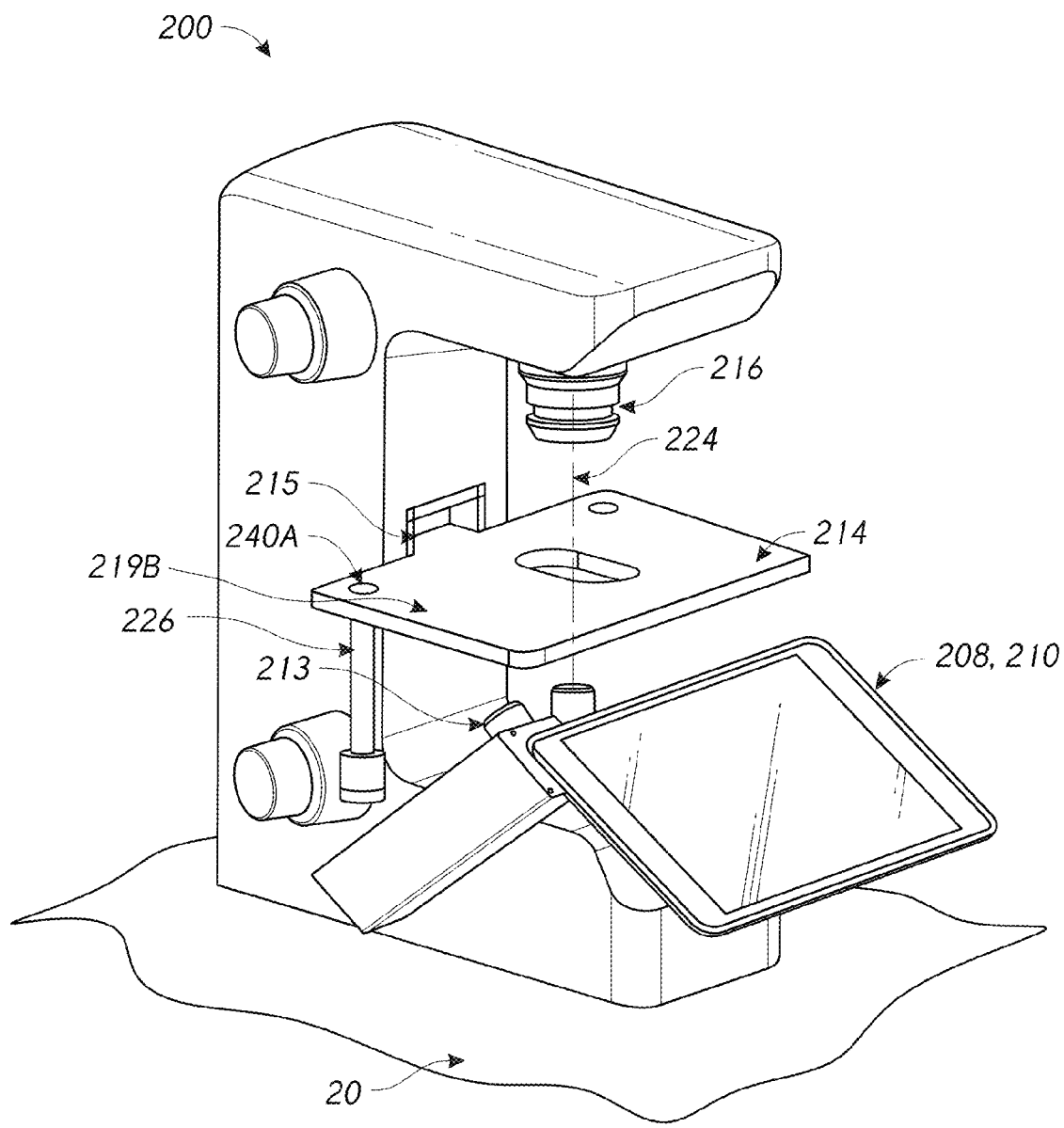
FIG. 7 illustrates an embodiment of a flipping microscope in an inverted configuration.

FIGS. 6 and 7 illustrate an example of a flipping microscope 200. Similar reference numerals refer to similar or identical structure to the first embodiment 100. Referring to FIG. 6, the microscope 200 is depicted in an upright configuration. The microscope 200 comprises a body 204. The body 204 is configured to support, directly or indirectly, at least one objective 213, a condenser 216, and a light source (not shown). The body 204 may further be configured to support a stage 214. The body 204 is configured to be picked up and flipped in order to convert the microscope 200 from an upright configuration (shown in FIG. 6) to an inverted configuration (shown in FIG. 7), and vice versa. Accordingly, the body 204 comprises flattened upper and lower surfaces, 252A and 252B respectively, that are configured to support the microscope 200 on a working surface 20.

The stage 214, if mounted to the body 204, may be mounted to one or more horizontal channels, a mounting block, or a height compensator as described above with reference to the microscope 100. If the stage 214 is mounted to the height compensator 215, the height compensator 215 may be disposed between the objective 213 and the condenser 216. As also described above with reference to the microscope 100, the stage 214 includes an opening aligned with the condenser 216, to allow light to pass through the stage 214 and illuminate the specimen. The height compensator 215 permits the stage 214 to slide between a first position and a second position along an optical axis 224, defined by the objective 213. The stage 214 comprises, on an outer surface, a first specimen supporting surface 219A and at an opposite surface, a second specimen supporting surface 219B. When the microscope 200 is in the upright configuration the stage 214 is in the first position and the first specimen supporting surface 219A is configured to support the specimen. When the microscope 200 is in the inverted configuration the stage 214 is in the second position and the second specimen supporting surface 219B is configured to support the specimen.

As described above with reference to the microscope 100, when the stage 214 is in the first position, the first specimen supporting surface 219A is positioned at a distance "D1" from an outer surface of a lens of the objective 213. Likewise, when the stage 214 is in the second position, the second specimen supporting surface 219B is positioned at a distance "D2" from the outer surface of the lens of the objective 213. To maintain the appropriate distance between the specimen supporting surface and the objective 213, the height compensator 215 allows the stage 214 to move between the first and second positions. By doing so, the height compensator 215 allows D2 to be the same value as D1 when the microscope 200 is flipped from the upright configuration to the inverted configuration. Likewise, the height compensator 215 allows D1 to be the same value as D2 when the microscope 200 is flipped from the inverted configuration to the upright configuration. In other words, the height compensator 215 maintains the distance (D1 or D2) between the appropriate specimen supporting surface (219A or 219B) and the objective 213, regardless of whether the microscope 200 is in the upright configuration or the inverted configuration. Accordingly, the position of a focal plane of the objective 213, with respect to the appropriate specimen supporting surface (219A or 219B), remains unchanged.

The microscope 200 may further comprise an optical arm 206. The optical arm 206 may be pivotably coupled to the body 204, thereby allowing the optical arm 206 to rotate about a pivoting axis 222. The microscope 200 may further comprise a cradle 208 disposed at a distal portion of the optical arm 206. The cradle 208 is configured to receive and secure an electronic device 210 that is capable of acquiring images.

A method for flipping the microscope 200 to thereby convert the microscope 200 from an upright configuration into an inverted configuration will now be discussed with reference to FIGS. 6 and 7. To convert the microscope 200 from the upright configuration (as shown in FIG. 6) into the inverted configuration (as shown in FIG. 7), the user picks up and flips the body 204 so that the upper surface 252A makes contact with the working surface 20.

The stage 214 automatically slides from the first position to the second position, in a direction along the optical axis 224, as the body 204 is flipped from the upright configuration into the inverted configuration. As a result, the distance between the specimen supporting surface (219A and 219B) and the outer surface of the lens of the objective 213 is maintained. In other words, the distance D2 is the same as the distance D1.

As discussed above with reference to the microscope 100, the user may remove and reposition the handle 226 from either the first or second receptacle 240A, 240B and reinsert the handle 226 in the other receptacle 240A, 240B, as desired. The handle 226 may further be inserted into the desired receptacle 240A, 240B from either side of the first or second specimen supporting surfaces 219A, 219B. Accordingly, the handle may be arranged so that its position with respect to the user, remains the same (e.g., lower right side of the microscope 200, lower left side of the microscope 200, upper right side of the microscope 200, or upper left side of the microscope 200).

A method for flipping the microscope 200 to thereby convert the microscope 200 from the inverted configuration into the upright configuration will now be discussed with reference to FIGS. 6 and 7. To convert the microscope 200 from the inverted configuration (as shown in FIG. 7) into the upright configuration (as shown in FIG. 6), the user picks up and flips the body 204 so that the lower surface 252B makes contact with the working surface 20.

The stage 214 automatically slides from the second position to the first position, in a direction along the optical axis 224, as the body 204 is flipped from the inverted configuration into the upright configuration. As a result, the distance between the specimen supporting surface (219A and 219B) and the outer surface of the lens of the objective 213 is maintained. In other words, the distance D1 is the same as the distance D2.

The user may remove and reposition the handle 226 from either the first or second receptacle 240A, 240B and reinsert the handle 226 in the other receptacle 240A, 240B, as desired. The handle 226 may further be inserted into the desired receptacle 240A, 240B from either side of the first or second specimen supporting surfaces 219A, 219B. Accordingly, the handle may be arranged so that its position with respect to the user, remains the same (e.g., lower right side of the microscope 200, lower left side of the microscope 200, upper right side of the microscope 200, or upper left side of the microscope 200).

Reconfigurable Embodiment

Figure 8:
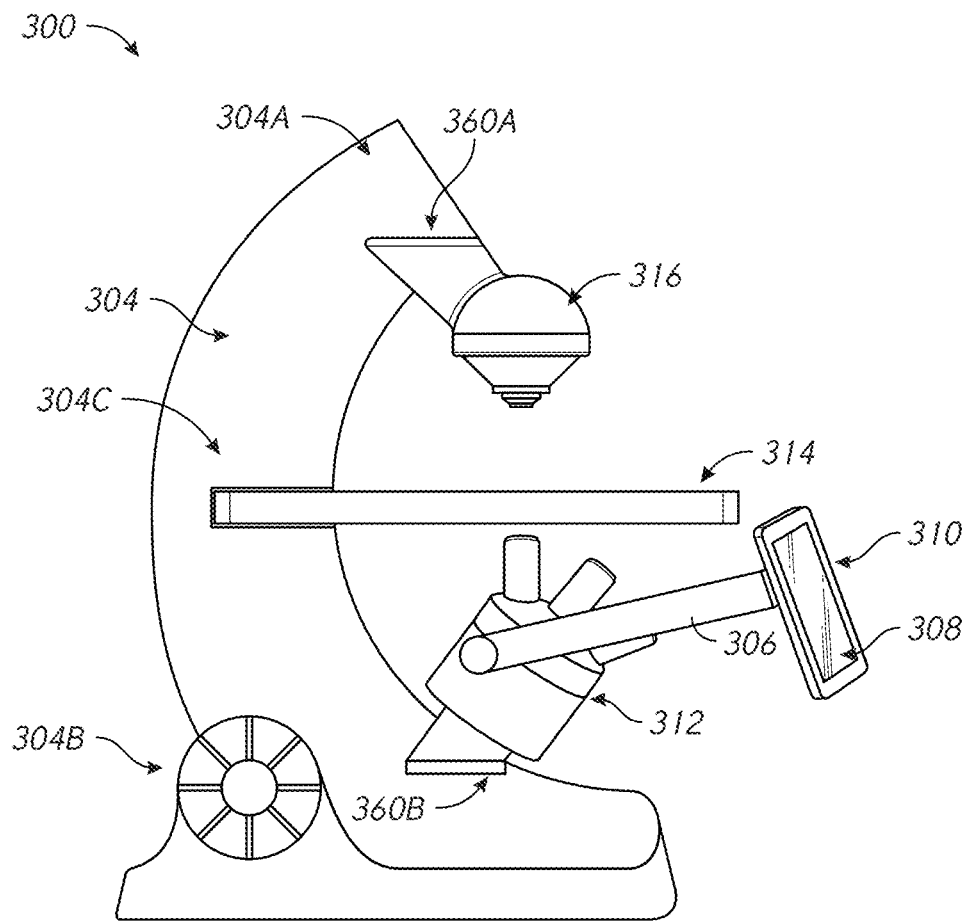
FIG. 8 illustrates an embodiment of a reconfigurable microscope in an upright configuration.

FIGS. 8-10B illustrate an example of a reconfigurable microscope 300. Similar reference numerals refer to similar or identical structure to the first embodiment 100. Referring to FIG. 8, the microscope 300 comprises a frame or body 304 having a first portion 304A, a second portion 304B and an intermediate portion 304C. The intermediate portion 304C is disposed between the first and second portions, 304A and 304B respectively. The intermediate portion 304C may be configured to mount a stage 314. The first portion 304A includes a first mounting feature 360A and the second portion 304B includes a second mounting feature 360B.

Figure 10A:
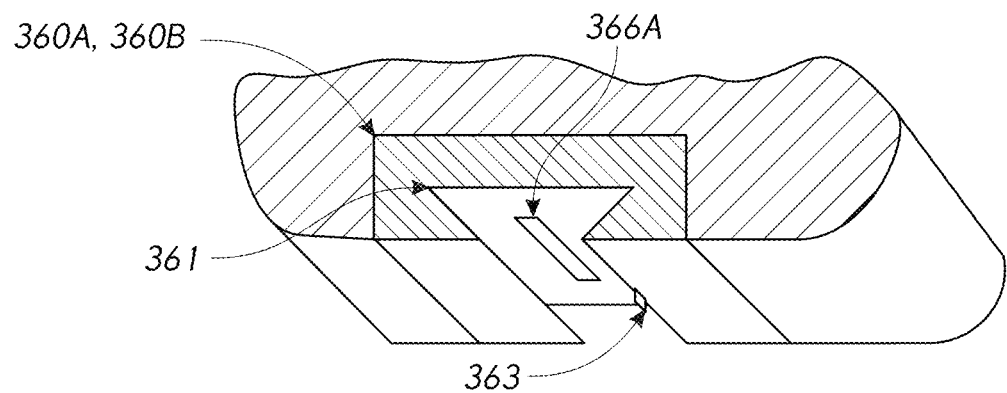
FIG. 10A illustrates an embodiment of a mounting feature.
Figure 10B:
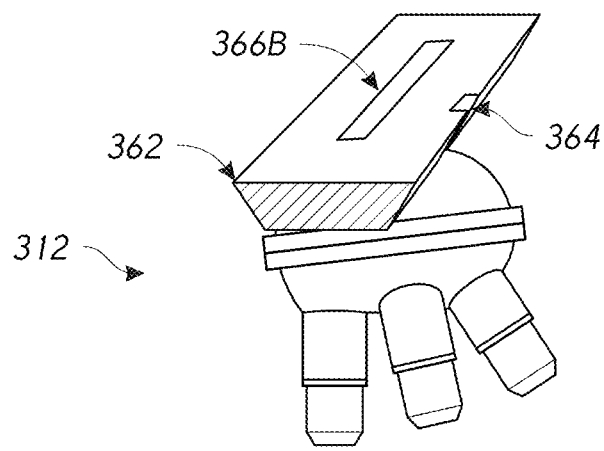
FIG. 10B illustrates an embodiment of an interchangeable component.

Referring to FIG. 10A, the first and second mounting features, 360A and 360B respectively, each comprise a channel 361 configured to receive interchangeable components. The interchangeable components may comprise a nose piece 312 having at least one objective 313, an objective 313, or a light source and condenser assembly 316. Referring to FIG. 10B, each of the interchangeable components comprises a rail 362 configured to engage the channel 361 of the first and second mounting features, 360A and 360B respectively. Accordingly, any of the interchangeable components may engage the first and second mounting features, 360A and 360B respectively. Although a channel and rail arrangement is used to mount the interchangeable components to the body 304, it is understood that other methods may be used to mount the interchangeable components to the body 304, such as the use of interference, friction or snap fits, or any other mechanical or electromechanical methods as known by those having ordinary skill in the art.

Referring to FIGS. 10A and 10B, in some aspects, each of the first and second mounting features, 360A and 360B respectively, may include a lock 363 configured to mechanically engage the interchangeable components. The lock 363 may comprise a tab configured to engage a corresponding indent 364 disposed on each of the interchangeable components. The lock 363 may be further configured to automatically engage the indent 364 upon insertion of the interchangeable component into the mounting features 360A and 360B. To disengage the lock 363, the tab may be moved to clear the indent 364 while simultaneously moving the interchangeable component away from the body 304.

In one aspect, each of the first and second mounting features, 360A and 360B respectively, may include an electrode 366A configured to provide electrical power to those interchangeable components that require power, such as the condenser assembly 316. For example, upon insertion of the condenser assembly 316 into the first or second mounting features, 360A and 360B respectively, a corresponding electrode 366B disposed within the condenser assembly 316 engages the electrode 366A, thereby energizing the light source of the condenser assembly 316.

Figure 9:
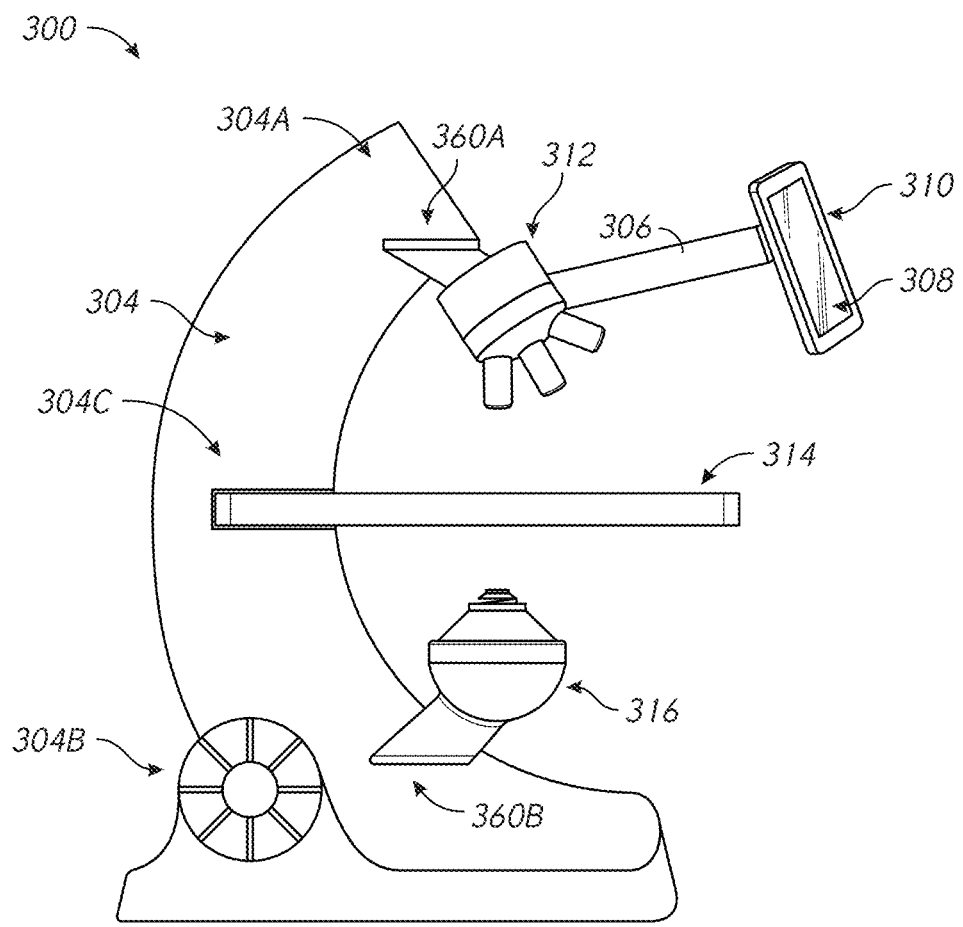
FIG. 9 illustrates an embodiment of the reconfigurable microscope of FIG. 8 in an inverted configuration.

Referring to FIG. 8, to configure the microscope 300 into an upright configuration, the nose piece 312 may be mounted in the first mounting feature 360A and the condenser assembly 316 may be mounted in the second mounting feature 360B. Referring to FIG. 9, to configure the microscope 300 into an inverted configuration, the nose piece 312 may be mounted in the second mounting feature 360B and the condenser assembly 316 may be mounted in the first mounting feature 360A.

In some aspects, the nose piece assembly 312 may further comprises an optical arm 306 pivotably coupled to the nose piece 312. The optical arm 306 may therefore, rotate about a pivoting axis 322. The optical arm 306 may further comprise a cradle 308 disposed at a distal portion of the optical arm 306. The cradle 308 is configured to receive and secure an electronic device 310 that is capable of acquiring images.

Modular Embodiment

Figure 11A:
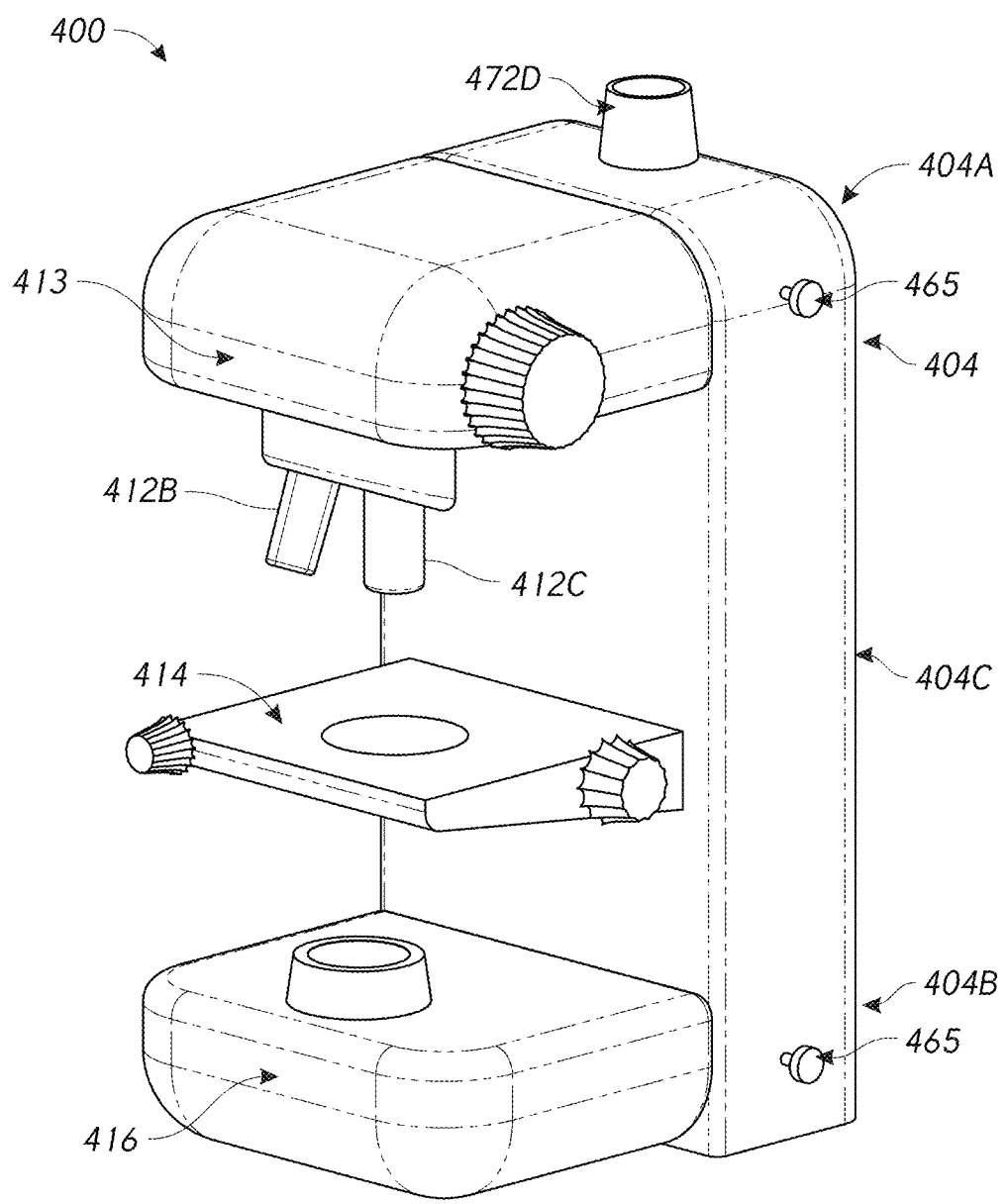
FIGS. 11A-11C illustrate an embodiment of a modular microscope in an upright configuration.
Figure 11B:
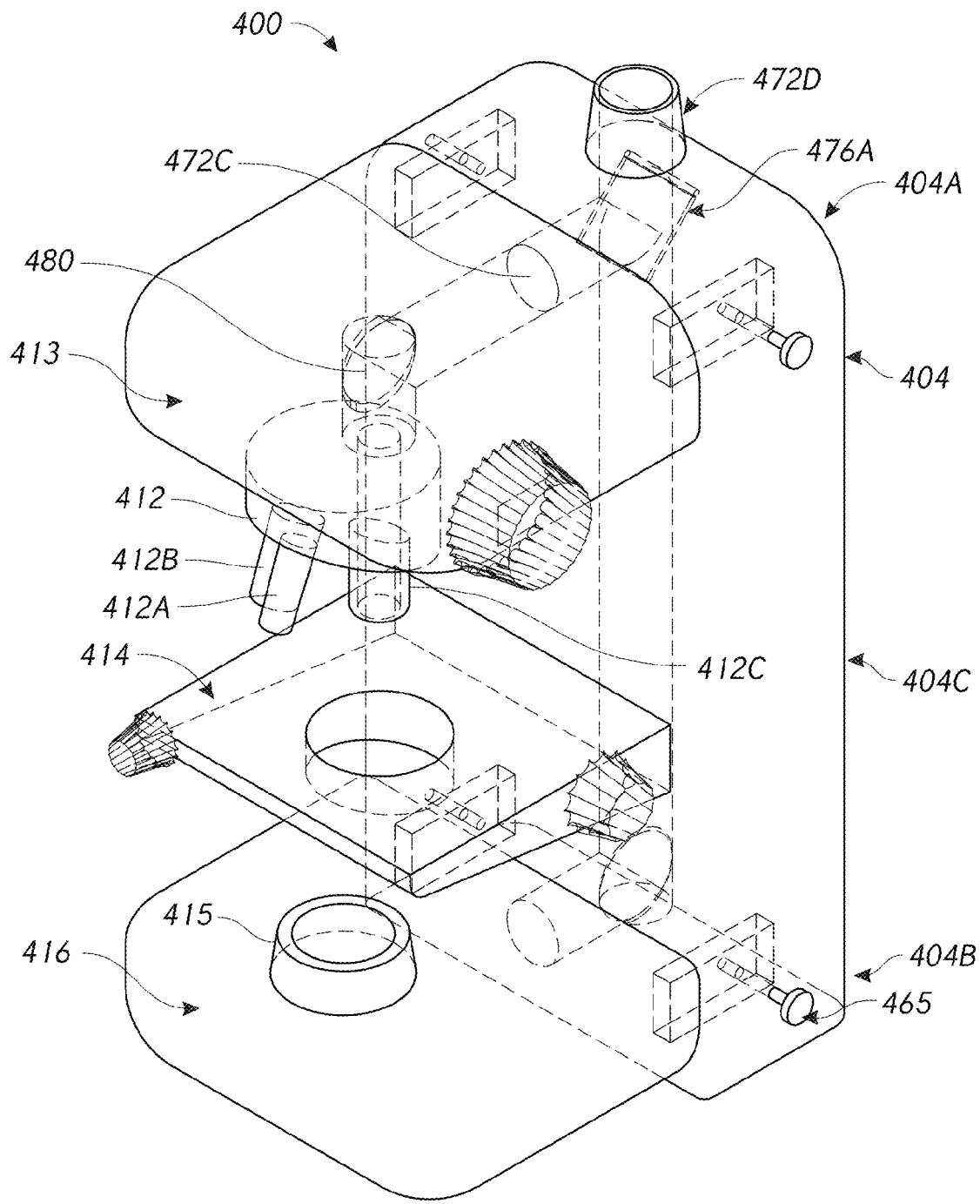
Figure 11C:
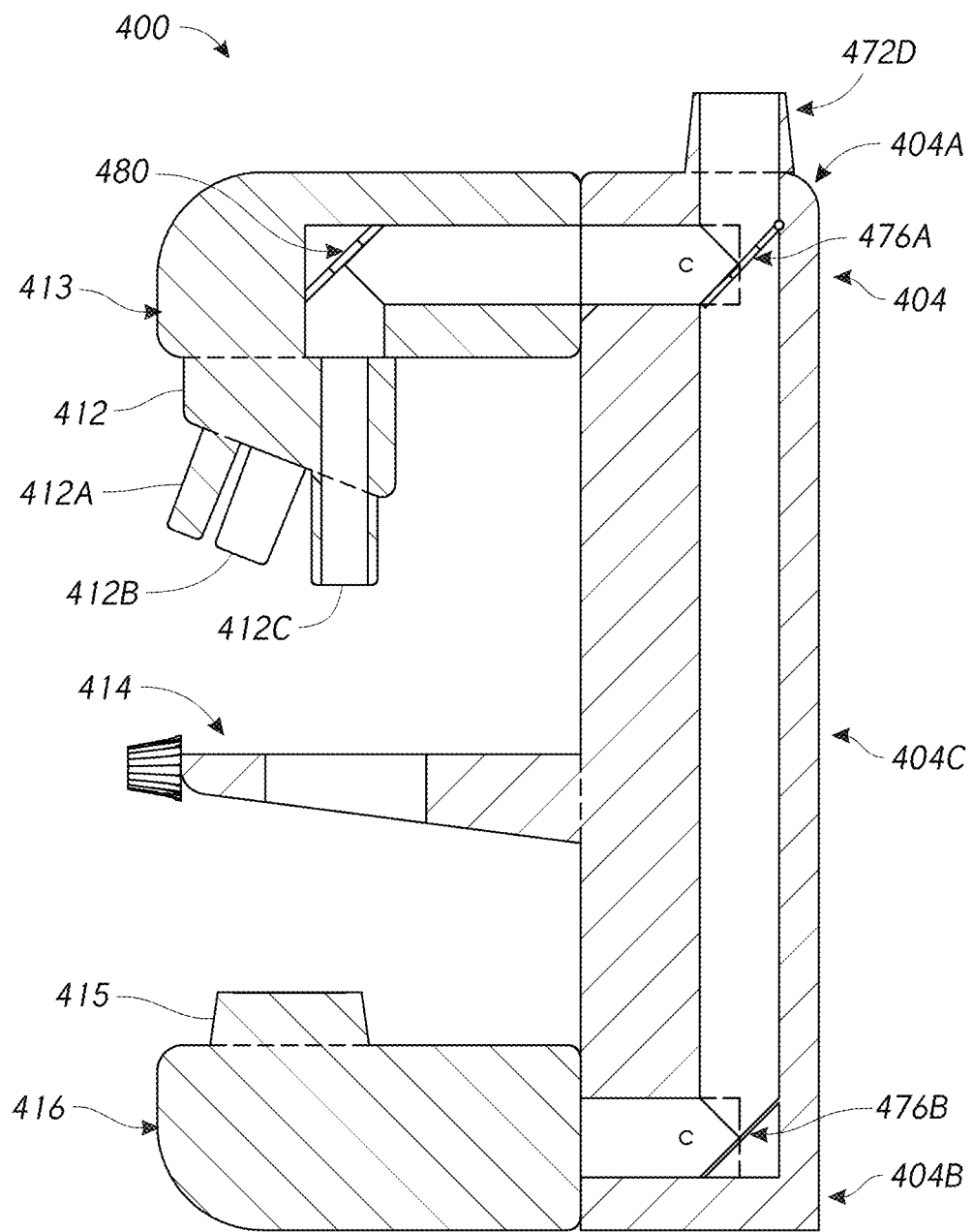
Figure 12A:
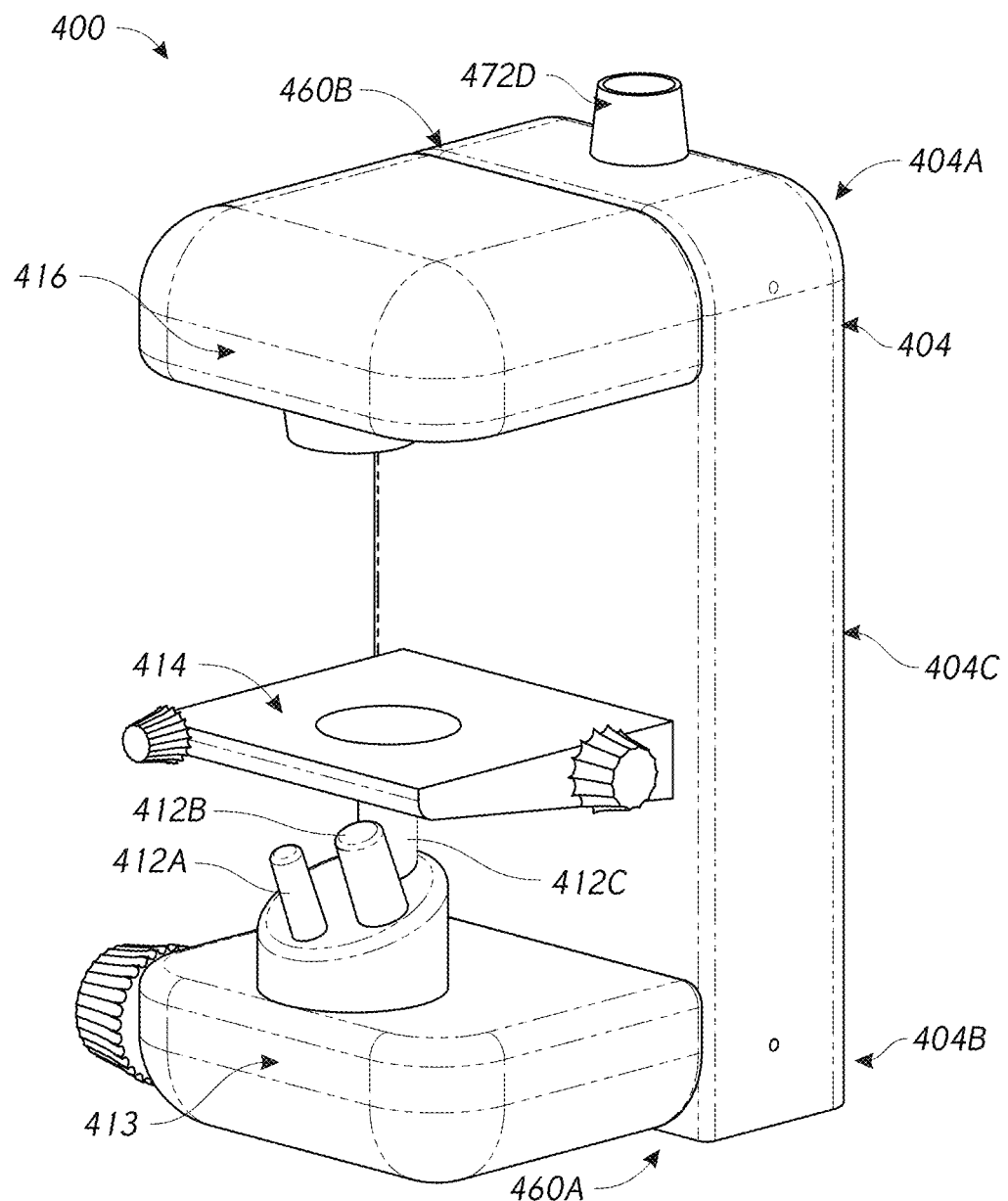
FIGS. 12A-12C illustrate an embodiment of the modular microscope of FIGS. 11A-11C in an inverted configuration.
Figure 12B:
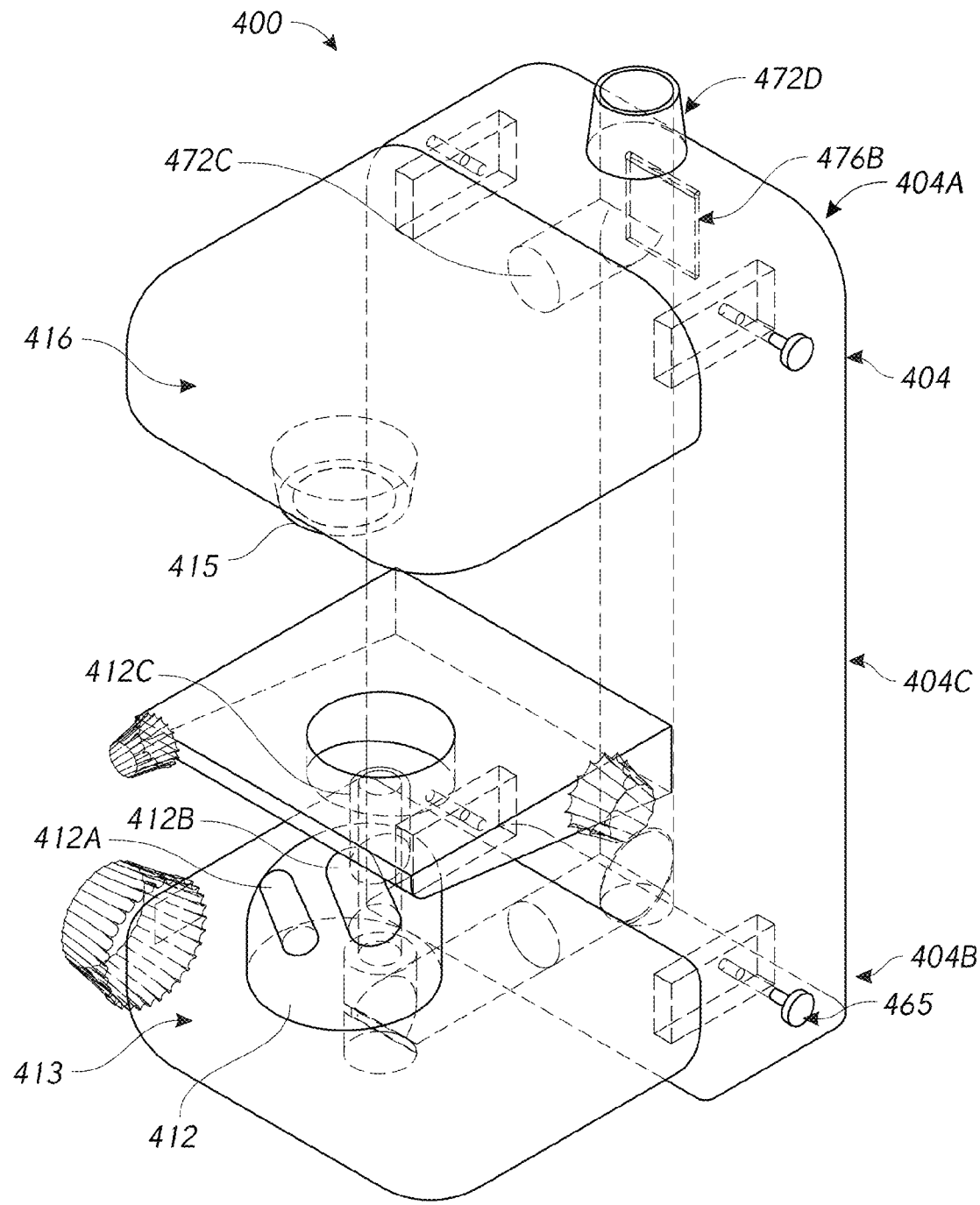
Figure 12C:
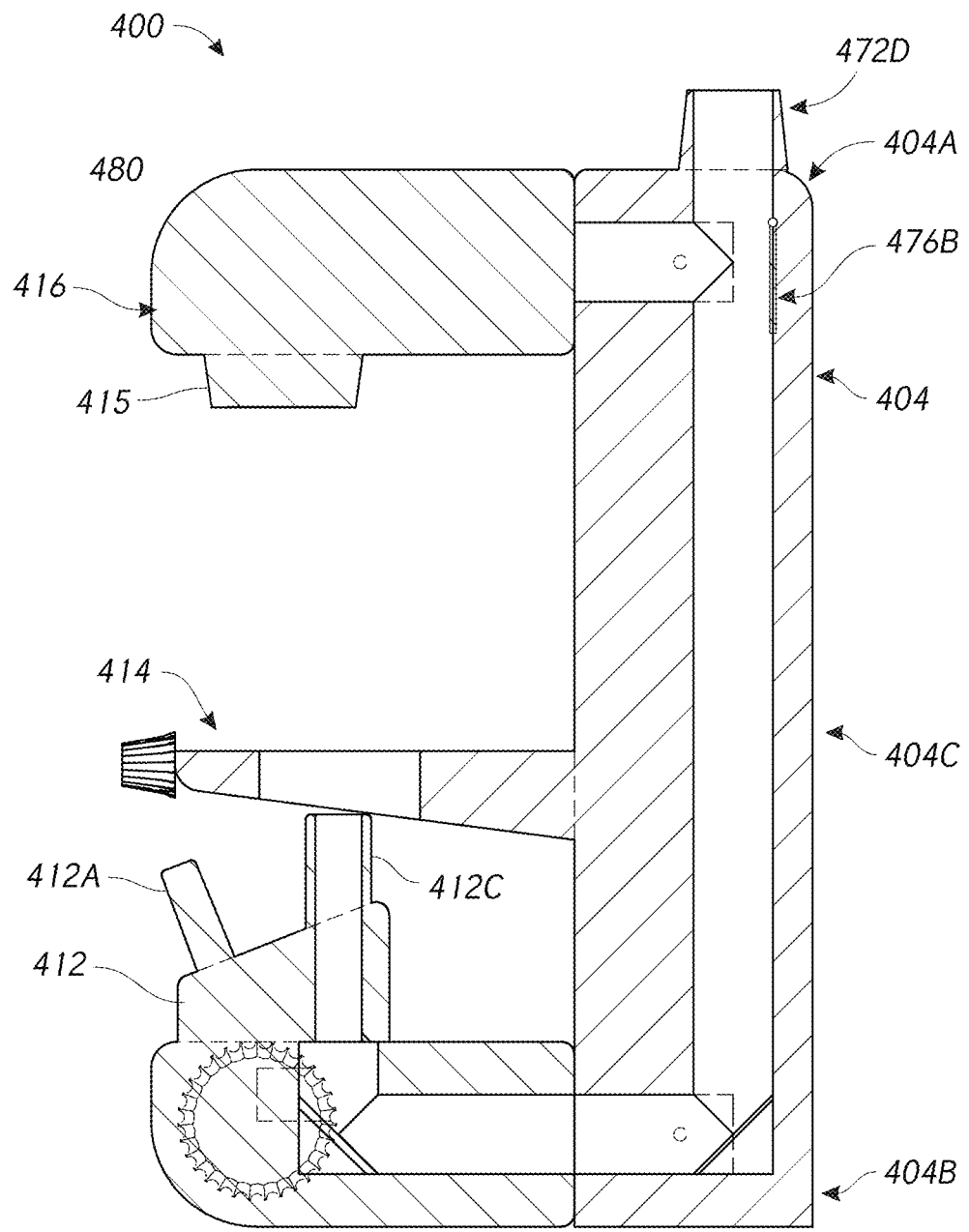

FIG. 11A illustrates an isometric view of a modular microscope 400 in the upright configuration. FIG. 11B illustrates an isometric view of the modular microscope 400 in the upright configuration, where dashed lines illustrate interior components. FIG. 11C illustrates a cross-sectional view of the modular microscope 400 in the upright configuration. FIG. 12A illustrates an isometric view of the modular microscope 400 in the inverted configuration FIG. 12B illustrates an isometric view of the modular microscope 400 in the inverted configuration, where dashed lines illustrate interior components. FIG. 12C illustrates a cross-sectional view of the modular microscope 400 in the inverted configuration. Similar reference numerals refer to similar or identical structure to the first embodiment 100. Referring to FIGS. 11A-11C, the microscope 400 comprises a body 404 having a first portion 404A, a second portion 404B and an intermediate portion 404C. The intermediate portion 404C is disposed between the first and second portions, 404A and 404B respectively. The intermediate portion 404C may be configured to mount a stage 414. The first portion 404A includes a first mounting feature 460A and the second portion 404B includes a second mounting feature 460B. Each of the first and second mounting features, 460A and 460B respectively, are configured to receive an objective module 413 and a condenser module 416. The objective module 413 houses the nose piece 412 and the condenser module 416 houses the condenser 415. The nose piece 412 may be coupled to one or more objectives 412A-C.

Referring to FIGS. 13A-13B and 14A-14D, each of the first and second mounting features, 460A and 460B respectively, may comprise slots 461 that are configured to receive corresponding posts 462 disposed in each of the objective and condenser modules, 413 and 416 respectively. In some aspects, each of the posts 462 include a latch pin hole 464 that is configured to receive a corresponding latch pin 463 disposed on the body 404. The latch pins 463 provide proper optical alignment of the objective and condenser modules, 413 and 416 respectively, along an optical axis 424 defined by the objective 413.

Referring to FIGS. 13A-13B, the body 404 includes an upper optical port 472A disposed proximate to the first portion 404A and a lower optical port 472B disposed proximate to the second portion 404B. Referring to FIGS. 11A-11C, 12A-12C, and 14C-14D, the upper and lower optical ports, 472A and 472B respectively, are arranged to be aligned with a corresponding optical port 472C of the objective module 413 (shown in FIGS. 14C-14D) when the microscope 400 is in either the upright configuration (as shown in FIGS. 11A-11C) or the inverted configuration (as shown in FIGS. 12A-12C). Accordingly, light entering the objective module 413 through nose piece 412 is reflected off of a fixed mirror 480 towards the optical port 472C of the objective module 413 and into the upper or lower optical ports, 472A and 472B respectively.

Referring to FIGS. 13A-13B, the body 404 includes an internal optical path 474 that is in communication with the upper and lower optical ports, 472A and 472B respectively. The optical path 474 includes a retractable mirror 476A and a fixed mirror 476B. The retractable mirror 476A is disposed proximal to the upper optical port 472A and when the retractable mirror 472A is in a first, engaged position, the retractable mirror 472A reflects light entering the upper optical port 472A toward an output port 472D. When the retractable mirror 472A is in a second, retracted position, the retractable mirror 472A is moved away from the optical path 474 and does not reflect light in the optical path 474. The fixed mirror 476B is disposed proximal to the lower optical port 472B and is arranged to reflect light entering the lower optical port 472B toward the output port 472D. The output port 472D may include supporting optics, such as an ocular lens. In other aspects, the output port 472D may comprise a cradle configured to receive an electronic device. The electronic device can comprise one of a mobile communications device (e.g., smartphone), tablet computer, laptop computer, PDA, digital camera, portable gaming console, or other portable computing device.

In one aspect, the retractable mirror 476A may be actuated mechanically or electrically. For example, a lever may be manipulated by the user to move the retractable mirror 476A to the first, engaged position or the second, retracted position. Alternatively, the retractable mirror 476A may be automatically actuated through detection of the arrangement of the objective module 413 and/or the condenser module 416. For example, each of the objective and condenser modules, 413 and 416 respectively, may have a unique electrical signal that enables a controller to detect whether the objective module 413 or the condenser module 416 is disposed within the first or second mounting features, 460A and 460B respectively. Should the controller detect that the objective module 413 is disposed within the first mounting feature 460A, then the retractable mirror 476A is positioned in the first, engaged position. Shall the controller detect that the objective module 413 is disposed within the second mounting feature 460B, then the retractable mirror 476A is positioned in the second, retracted position. In another example, the retractable mirror 476A may be actuated automatically through an electrical connection made between a particular slot 461 and post 462. For instance, one of the posts 462 may be configured to provide electrical power to a predefined slot 461 that is electrically coupled to a motor or actuator. Energizing the motor or actuator thereby causes the retractable mirror 476A to be actuated to the first, engaged position or to the second, retracted position, depending on the arrangement of the objective and condenser modules. In another example, the retractable mirror 476A may be actuated through activation of one or more buttons or keys that are disposed on the body 404. In this example, the user may depressed the button or key to cause the retractable mirror 476A to be positioned in the first, engaged position or the second, retracted position via actuation of a motor or actuator coupled to the retractable mirror 476A. It is understood that other mechanical or electrical methods, as known by those having ordinary skill in the art, may be used to position the retractable mirror 476A in the first, engaged position or the second, retracted position.

Referring to FIGS. 11A-11C, when the microscope 400 is in the upright configuration, the retractable mirror 476A is positioned in the engaged position and reflects light directed from the objective module 413 to the fixed mirror 480 toward the output port 472D. Referring to FIGS. 12A-12C, when the microscope 400 is in the inverted configuration, the retractable mirror 476A is positioned in the retracted position and does not reflect light in the optical path 474. Rather, in the inverted configuration, another fixed mirror 476B reflects light entering the objective module 413 toward the output port 472D. Retractable mirror 476A can be coupled to a hinge or pivot 485 to pivot the mirror between the engaged position and the retracted position.

Figure 14A:
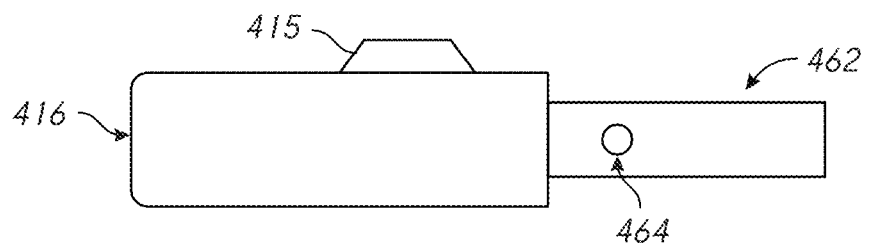
FIG. 14A-14B illustrate a condenser module of a modular microscope.
Figure 14B:
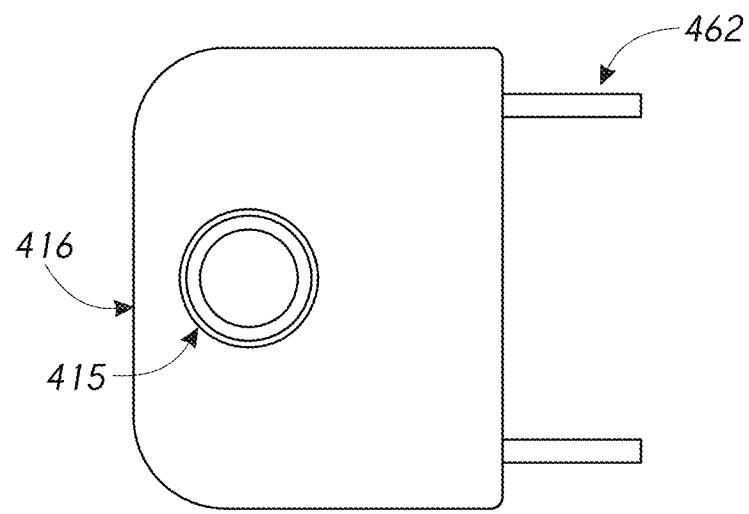
Figure 14C:
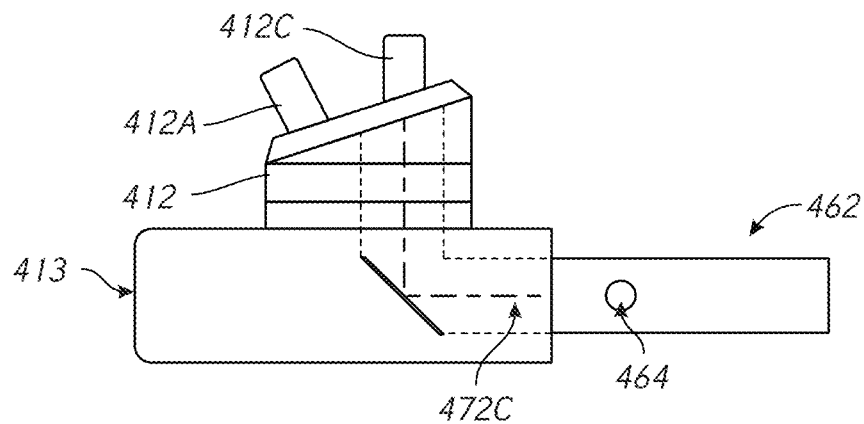
FIG. 14C-14D illustrate an objective module of a modular microscope.
Figure 14D:
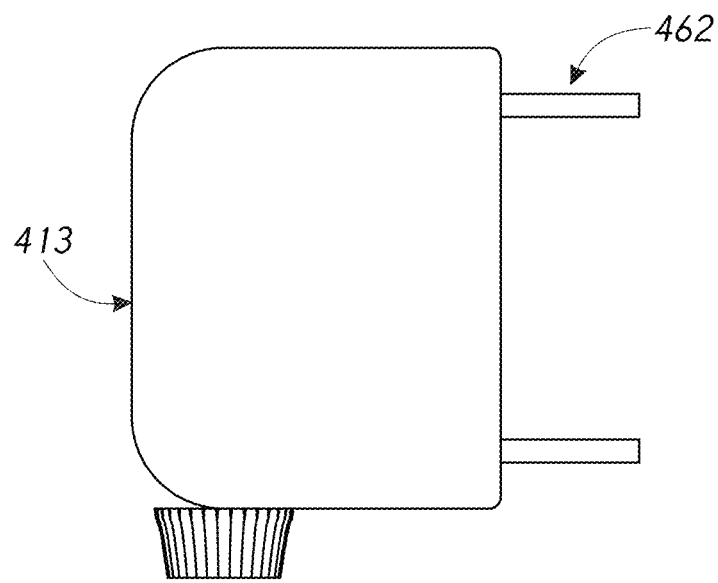

Referring to FIG. 14A-14B, the condenser module 416 comprises a structure housing a condenser 415 and light source. Referring to FIG. 14C-14D, the objective module 413 comprises a nose piece 412 onto which at least one objective 412A-C is mounted. As discussed above, the objective and condenser modules, 413 and 416 respectively, each comprise posts 462 that are held within corresponding slots 461 in the base 404 by latch pins 463 that are engaged into corresponding latch pin holes 464. In some aspects, the condenser module 416 may be electrically coupled to the base 404 to provide power to the light source. In other aspects, the objective module 413 may be electrically coupled to the base 404 to power a focusing mechanism. Alternatively, the objective and condenser modules, 413 and 416 respectively, may be self-powered by a battery housed within each of the objective and condenser modules, 413 and 416 respectively.

Swing Arm Embodiment

Figure 15:
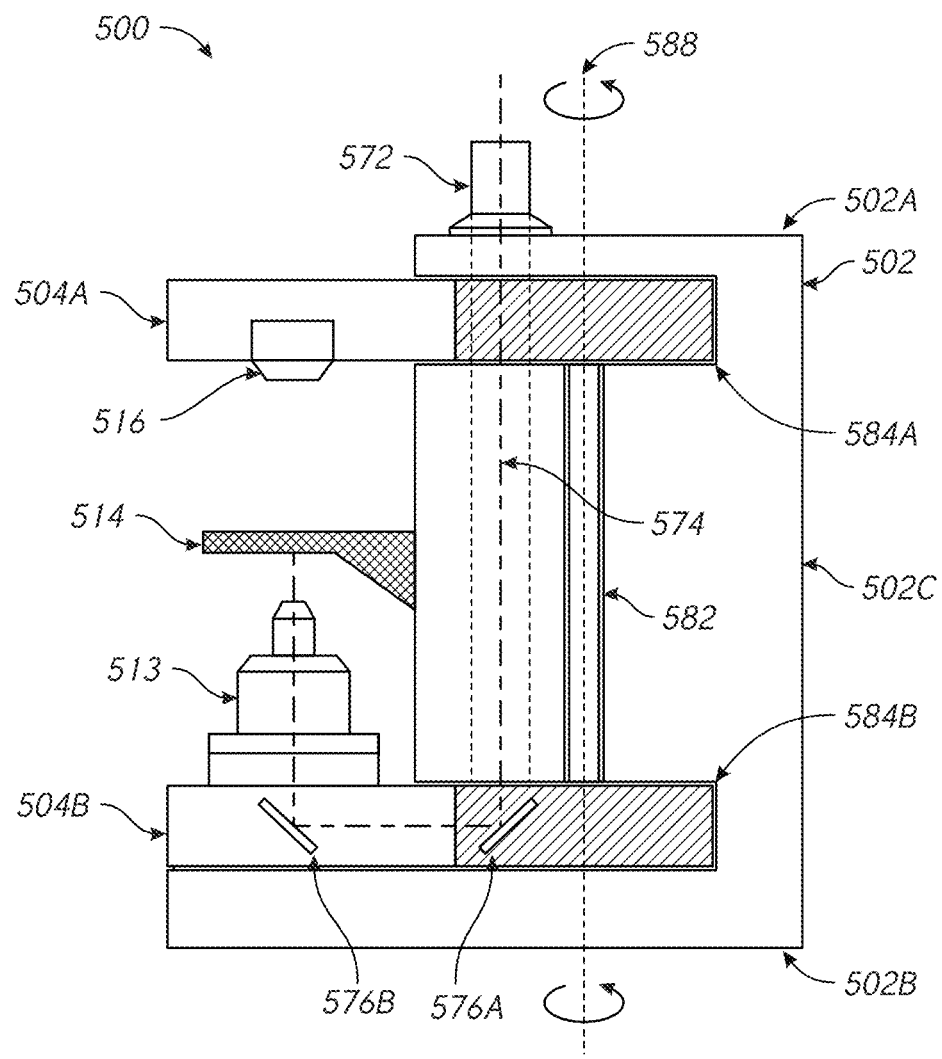
FIG. 15 illustrates an embodiment of a swing arm microscope.
Figure 16A:
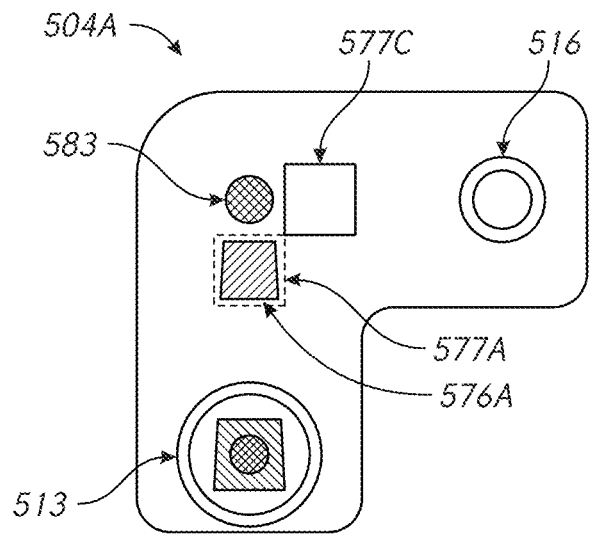
FIG. 16A illustrates an embodiment of an upper swing arm.
Figure 16B:
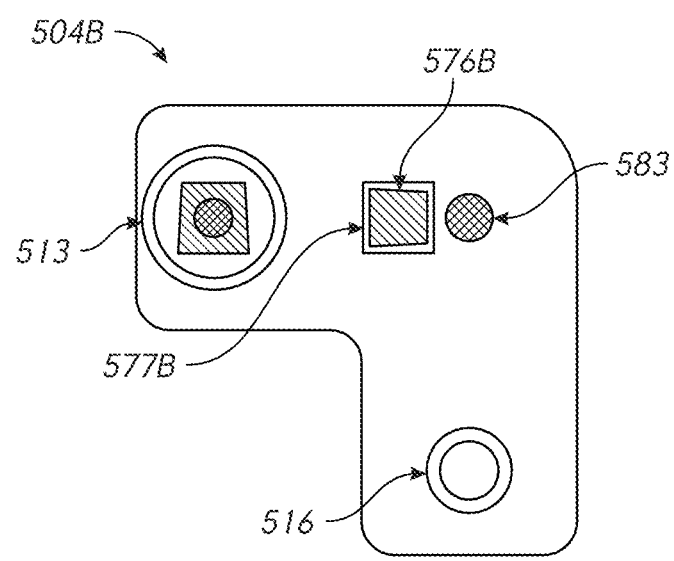
FIG. 16B illustrates an embodiment of a lower swing arm.

FIGS. 15-16B illustrate an example of a swing arm microscope 500. Similar reference numerals refer to similar or identical structure to the first embodiment 100. Referring to FIG. 15, the microscope 500 comprises a base 502 having an upper portion 502A, a lower portion 502B and an intermediate portion 502C. The intermediate portion 502C is disposed between the upper and lower portions, 502A and 502B respectively. The intermediate portion 502C may be configured to mount a stage 514. The upper portion 502A includes a first slot 584A and the lower portion 502B includes a second slot 584B. The first slot 584A is configured to receive an upper swing arm 504A and the second slot 584B is configured to receive a lower swing arm 504B.

Each of the upper and lower swing arms, 504A and 504B respectively, are configured to swing within their corresponding slots, 584A and 584B respectively, along a pivoting axis 588 defined by a spindle 582. In one aspect, the pivoting axis is disposed along a plane of symmetry of the upper and lower swing arms 504A, 504B. Referring to FIG. 15, the spindle 582 is disposed within the base 502. The upper and lower swing arms, 504A and 504B respectively, are pivotably coupled to the spindle 582 via rotational mounts 583 (as shown in FIGS. 16A and 16B). In one aspect, the upper and lower swing arms, 504A and 504B respectively, swing together because each is coupled to the same spindle 582. Accordingly, the upper and lower swing arms, 504A and 504B respectively, move together about the pivoting axis 588.

Referring to FIGS. 16A and 16B, each of the upper and lower swing arms 504A, 504B include an objective 513 and a condenser 516. The upper and lower swing arms 504A, 504B may have similar profiles such as, for example, an "L" shaped, square shaped, or round shaped profile. Although the objective 513 and the condenser 516 of each swing arm 504A, 504B are depicted as being 90 degrees apart, it is understood that other angles may be used without departing from the scope of this disclosure. For example, the objective 513 and the condenser 516 of each swing arm 504A, 504B may be disposed at any angle ranging from 10-180 degrees. In some aspects, the pivoting axis 588 may be disposed between the objective 513 and the condenser 516 of the upper and lower swing arms 504A, 504B.

Referring to FIG. 16A, the upper swing arm 504A includes a first optical port 577A and a second optical port 577C. The first optical port 577A includes a mirror 576A that is configured to reflect light entering the objective 513 of the upper swing arm 504A toward an optical path 574 disposed within the base 504 (shown in FIG. 15). The second optical port 577C comprises a through hole that allows light entering the objective 513 of the lower swing arm 504B to exit an output port 572. Referring to FIG. 15, the output port 572 may include supporting optics, such as an ocular lens and may comprise a cradle configured to receive an electronic device.

Referring to FIG. 16B, the lower swing arm 504B includes an optical port 577B. The optical port 577B includes a pair of mirrors 576A, 576B that is configured to reflect light entering the objective 513 of the lower swing arm 504B toward the optical path 574 of the base 504 (shown in FIG. 15).

In one aspect, because each swing arm 504A, 504B includes an objective 513 and condenser 516, conversion of the microscope 500 from an upright configuration to an inverted configuration, or vice versa, simply requires that the swing arms 504A, 504B be arranged so that the objective 513 and condenser 516 are positioned according to the desired configuration. For example, shall the user desire to use the microscope 500 in an upright configuration, the user would position the swing arms 504A, 504B so that the objective 513 of the upper swing arm 504A is disposed above the specimen to be observed and the condenser 516 of the lower swing arm 504B is disposed below the specimen to be observed. As discussed above, because the upper and lower swing arms, 504A and 504B, are coupled to the same spindle 582, rotation of one of the swing arms 504A, 504B causes rotation of the other swing arm 504A, 504B.

In this example, after light enters the objective 513 of the upper swing arm 504A, light is reflected and directed toward the first optical port 577A via the mirror 576A. Light exiting the first optical port 577A enters the optical path 574 of the base 504 and exits from the output port 572.

In another example, should the user desire to use the microscope 500 in an inverted configuration, the user would position the swing arms 504A, 504B so that the objective 513 of the lower swing arm 504B is disposed below the specimen to be observed and the condenser 516 of the upper swing arm 504A is disposed above the specimen to be observed. Again, because the upper and lower swing arms, 504A and 504B, are coupled to the same spindle 582, rotation of one of the swing arms 504A, 504B causes rotation of the other swing arm 504A, 504B.

In this example, after light enters the objective 513 of the lower swing arm 504B, light is reflected and directed toward the optical port 577B via the mirror 576B. Light exiting the optical port 577B enters the optical path 574 of the base 504, passes through the second optical port 577C of the upper swing arm 504A, and ultimately exits from the output port 572. The cradle 608 configured to receive and secure an electronic device 610 that is capable of acquiring images, and to align an optical element of the electronic device 610 with the output port 572. The electronic device 610 can be a portable personal computing device including an optical element (e.g., a camera), for example a mobile communications device (e.g., smartphone), tablet computing device, laptop, PDA, portable gaming device, camera, or other portable computing device with imaging capabilities.

Accordingly, the objective 513 of the upper swing arm 504A is used when the microscope 500 is in the upright configuration and the condenser 516 of the upper swing arm 504A is used when the microscope 500 is in the inverted configuration. Similarly, the objective 513 of the lower swing arm 504B is used when the microscope 500 is in the inverted configuration and the condenser 516 of the lower swing arm 504B is used when the microscope 500 is in the upright configuration.

Laterally Rotating Embodiment

Figure 17A:
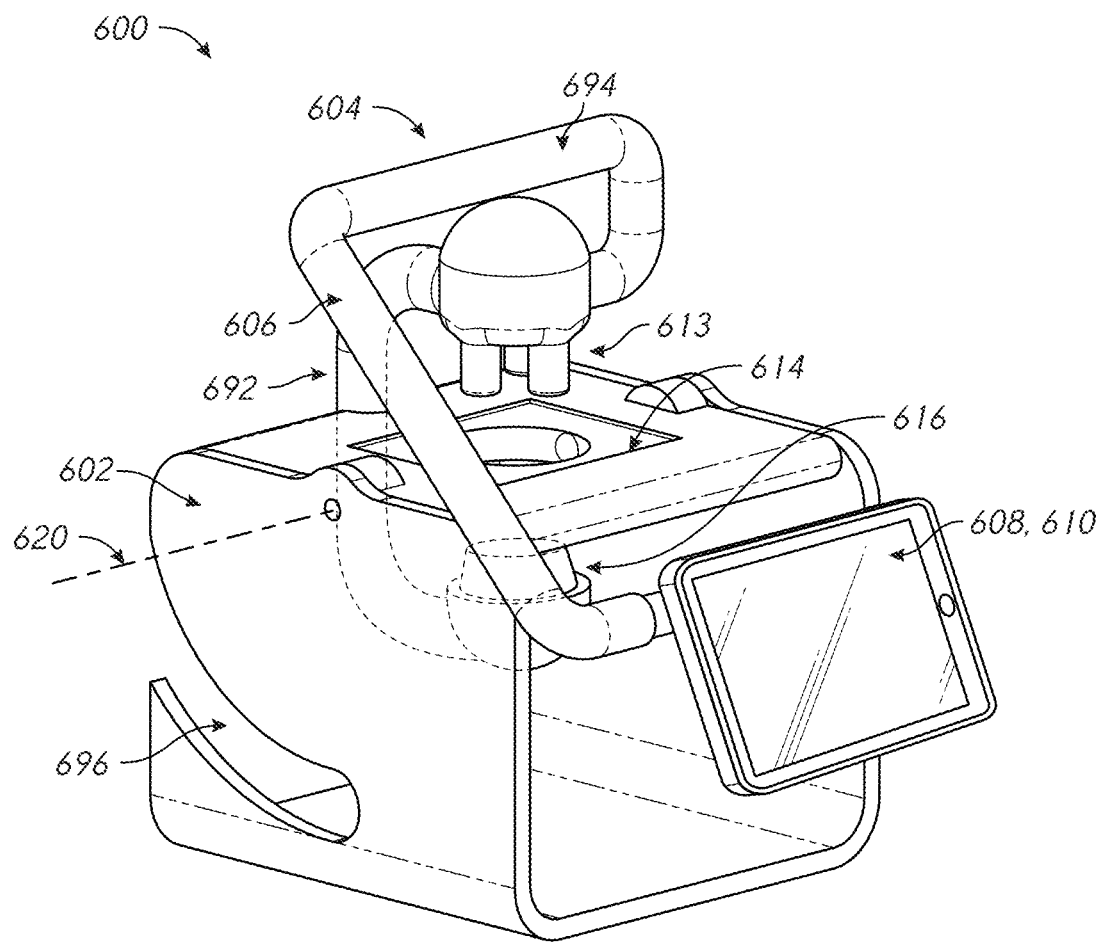
FIGS. 17A-17B illustrate an embodiment of a laterally rotating microscope.
Figure 17B:
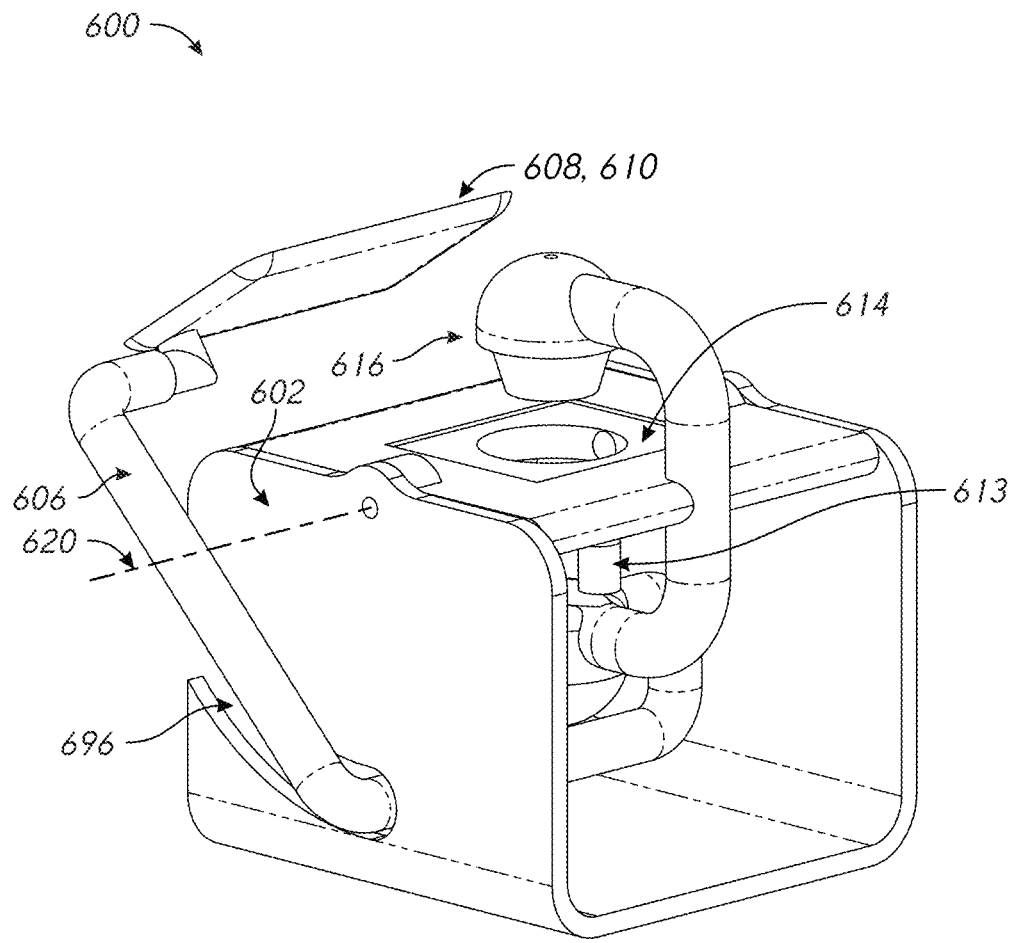

FIG. 17A illustrates an example of a laterally rotating microscope 600 in an upright configuration, and FIG. 17B illustrates an example of the laterally rotating microscope 600 in an inverted configuration. Similar reference numerals refer to similar or identical structure to the first embodiment 100. Referring to FIGS. 17A-17B, the microscope 600 comprises a base 602 and a rotating assembly 604. The rotating assembly 604 may include an objective 613, an optical arm 606, a cradle 608, a stage 614, and a condenser 616, that are all configured to rotate together as a single assembly, along a rotating axis 620 that extends along a lateral direction with respect to the microscope 600. The rotating axis 620 is defined by rotational couplings disposed at opposite ends of the stage 614.

In one aspect, the optical arm 606 may be coupled to the objective 613 and configured to reflect light entering the objective 613 toward an optical input of an electronic device 610. The electronic device 610 may be removably attached to the optical arm 606 via the cradle 608.

The objective 613 and the condenser 616 are connected by a structural arm 692. The structure arm 692 supports and arranges the objective 613 and the condenser 616 with respect to the stage 614. As shown in FIGS. 17A-17B, the objective 613 and condenser 616 may be arranged at opposing ends of the structure arm 692.

To convert the microscope 600 into an inverted configuration, a handle 694 of the rotating assembly 604 is rotated along the rotating axis 620 until the handle 694 engages a slot 696 disposed within the base 602. As a result of such rotation, the rotating assembly 604 is rotated about 180 degrees, thereby positioning the objective 613 below the stage 614 and the condenser 616 above the stage 614. As discussed above with reference to the stage 114, the stage 614 may be configured to support a specimen on both a first and second specimen supporting surface.

Overview of Example Controller and User Interface Components

Figure 18:
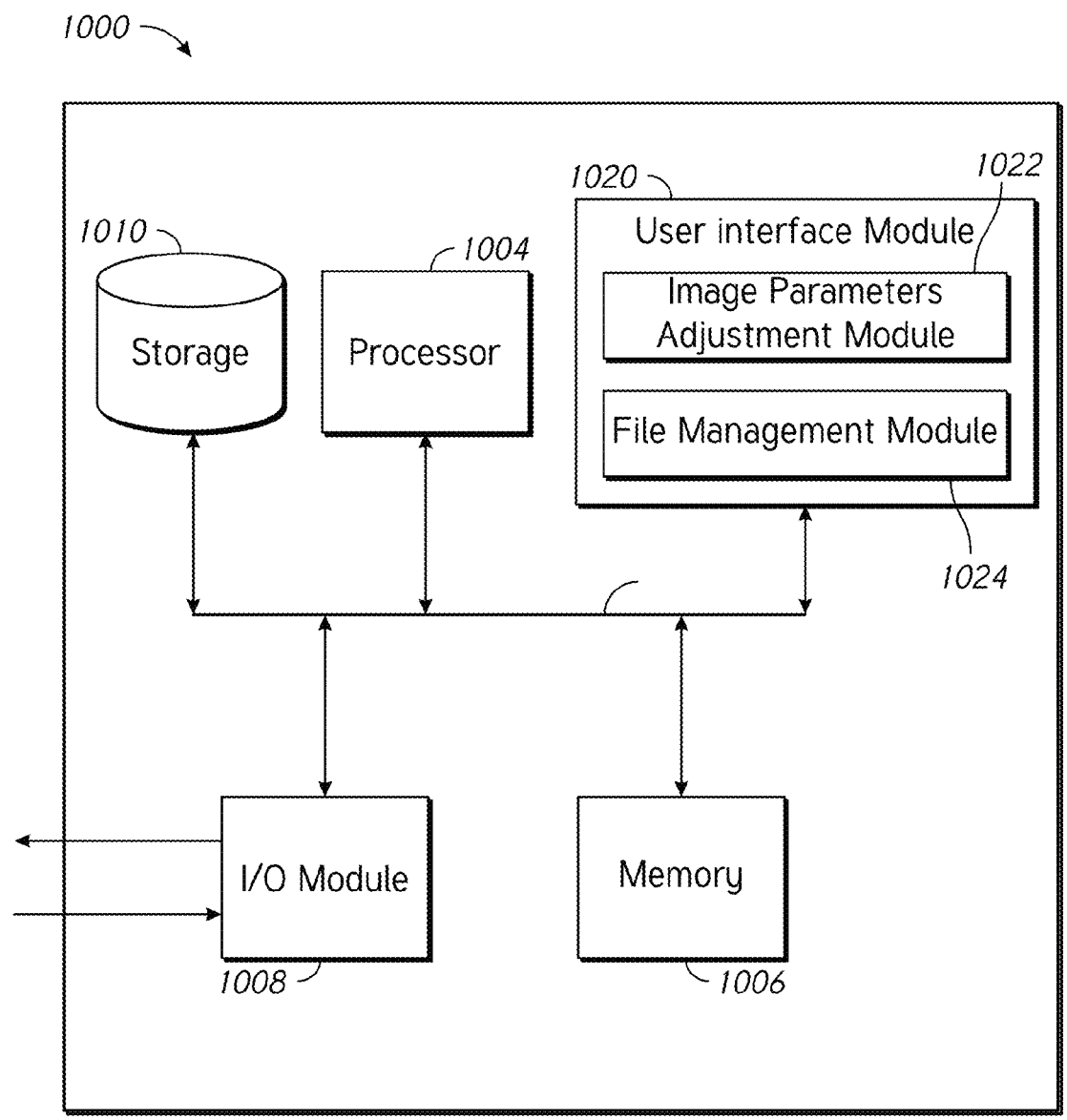
FIG. 18 illustrates a high-level schematic block diagram of an embodiment of an electronic system for use with a reconfigurable microscope as described herein.

FIG. 18 is a block diagram illustrating components of controller 1000 that can be used to manage a dual-use microscope. The controller 1000 can be integral to the microscope in some embodiments. In other embodiments, the controller 1000 can be separate from the microscope, for example the controller 1000 can be included in a user portable computing device (e.g., smartphone, tablet, laptop, personal digital assistant, or the like) configured to communicate and/or cooperate with the microscope. In further embodiments, aspects of the controller 1000 can be integral to the microscope and aspects of the controller 1000 can be separate from the microscope.

Controller 1000 comprises user interface module 1020, processor module 1004, storage module 1010, input/output (I/O) module 1008, memory module 1006, and bus 1002. Bus 1002 may be any suitable communication mechanism for communicating information. Processor module 1004, storage module 1010, I/O module 1008, and memory module 1006 are coupled with bus 1002 for communicating information between any of the modules of controller 1000 and/or information between any module of controller 1000 and a device external to controller 1000. For example, information communicated between any of the modules of controller 1000 may include instructions and/or data. In some aspects, bus 1002 may be a universal serial bus. In some aspects, bus 302 may provide Ethernet connectivity.

User interface module 1020 can generate a graphical user interface for enabling user interaction with the dual-configuration microscope and/or image data gathered from the dual-configuration microscope, and includes image parameters adjustment module 1022 and file management module 1024. User interface module 1020 can be available as a set of software instructions, for example an application that can be downloaded or otherwise provided to an electronic device configured to be received by the cradle of the optical arm of the dual-configuration microscope to acquire images. The image parameters adjustment module 1022 can provide functionality for a user to adjust the brightness, contrast, and color settings of acquired images. The file management module 1024 can provide functionality for naming and archiving of acquired images. For example, for archiving the file management module 1024 can provide controls for naming a file, naming an album, and choosing which file type to use for saving an acquired image (e.g., .jpeg, .tiff, .png). For example, for file sharing the file management module 1024 can provide functionality to send an acquired image by email or other electronic communication, to interface with and upload to a local network server, or to share using global network filesharing services.

In some aspects, processor module 1004 may comprise one or more processors, where each processor may perform different functions or execute different instructions and/or processes. For example, one or more processors may execute instructions for focusing on a specimen, positioning a specimen with respect to an objective, operating of a light source, controlling of a condenser, acquiring an image, processing an image, sending an image to another device, altering light pathways and illumination settings, automated X-Y stage movement, controlling external hardware devices (e.g., camera), controlling other computer devices (e.g., onboard mini-computer, onboard controllers), communicating with another device, and one or more processors may execute instructions for input/output functions.

Memory module 1006 may be random access memory ("RAM") or other dynamic storage devices for storing information and instructions to be executed by processor module 1004. Memory module 1006 may also be used for storing temporary variables or other intermediate information during execution of instructions by processor 1004. In some aspects, memory module 1006 may comprise battery-powered static RAM, which stores information without requiring power to maintain the stored information. Storage module 1010 may be a magnetic disk or optical disk and may also store information and instructions. In some aspects, storage module 1010 may comprise hard disk storage or electronic memory storage (e.g., flash memory). In some aspects, memory module 1006 and storage module 1010 are both a machine-readable medium.

Controller 1000 is coupled via I/O module 1008 to a user interface for providing information to and receiving information from a user controlling functions of a microscope, operations of a microscope, or for causing actuation of certain components of a microscope (e.g., movement of a retractable mirror, stage, or objective). For example, the user interface may be a cathode ray tube ("CRT"), LCD monitor, or touch-screen display for displaying information to an operator. The user interface may also include, for example, a keyboard, a mouse, or a touch-screen device coupled to controller 1000 via I/O module 1008 for communicating information and command selections to processor module 1004.

According to various aspects of the subject disclosure, methods described herein are executed by controller 1000. Specifically, processor module 1004 executes one or more sequences of instructions contained in memory module 1006 and/or storage module 1010. In one example, instructions may be read into memory module 1006 from another machine-readable medium, such as storage module 1010. In another example, instructions may be read directly into memory module 1006 from I/O module 1008, for example from a user controlling functions of a microscope, operations of a microscope, or for causing actuation of certain components of a microscope (e.g., movement of a retractable mirror, stage, or objective) via the user interface. Execution of the sequences of instructions contained in memory module 1006 and/or storage module 1010 causes processor module 1004 to control functions of the microscope, operations of the microscope, or actuation of certain components of the microscope (e.g., movement of a retractable mirror, stage, or objective). For example, focusing operations, image processing and acquisition, and component actuation instructions may be stored in memory module 1006 and/or storage module 1010 as one or more sequences of instructions. Information such as the distance between a specimen supporting surface and a condenser, or position of an objective or condenser with respect to a specimen may be communicated from processor module 1004 to memory module 1006 and/or storage module 1010 via bus 1002 for storage. In some aspects, the information may be communicated from processor module 1004, memory module 1006, and/or storage module 1010 to I/O module 1008 via bus 1002. The information may then be communicated from I/O module 1008 to a user operating the microscope.

One or more processors in a multi-processing arrangement may also be employed to execute the sequences of instructions contained in memory module 1006 and/or storage module 1010. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 1004 for execution. Such a medium may take many forms, including, but not limited to, non-volatile media, volatile media, and transmission media. Non-volatile media include, for example, optical or magnetic disks, such as storage module 1010. Volatile media include dynamic memory, such as memory module 1006. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Figure 19:
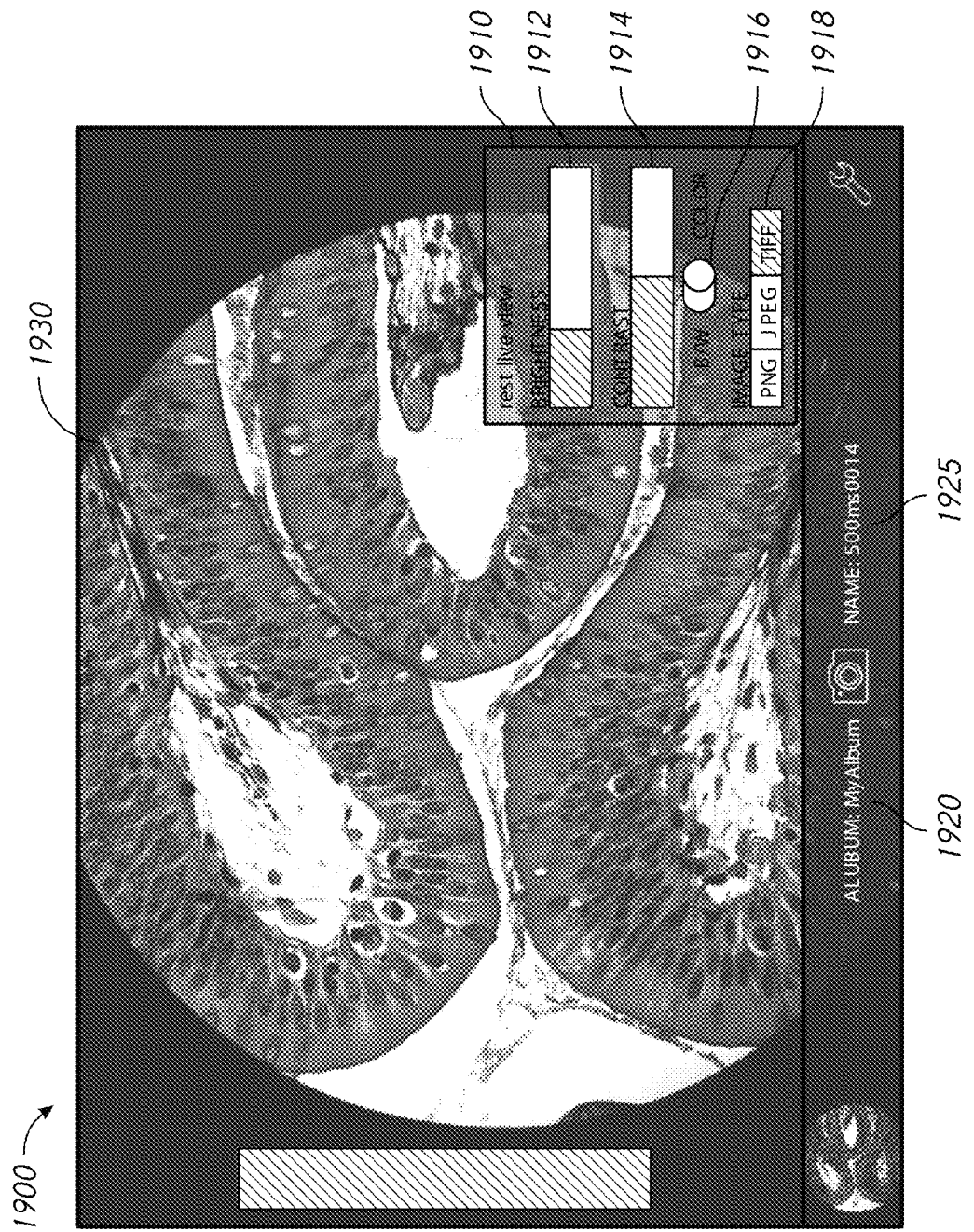
FIG. 19 illustrates and example of a user interface provided on a mobile computing device configured to cooperate with a dual-configuration microscope.

FIG. 19 illustrates and example of a user interface 1900 provided on a computing device configured to cooperate, at least optically and in some examples electronically, with a dual-configuration microscope. The user interface 1900 can be generated in some embodiments by the user interface module 1020 of the controller 1000.

As illustrated, the user interface includes a specimen display area 1930, an image parameter control panel 1910, and file naming controls 1920, 1925. The specimen display area 1930 displays to a user a visual representation of the specimen positioned in the optical path of the microscope. In some embodiments, the visual representation can be adjusted by the user, for example by zooming, rotating, or using other adjustment controls presented in the image parameter control panel 1910. In other aspects, the visual representation of the specimen can be received by a camera of the device used to present the interface 1900. For example, an electronic device positioned in the cradle of a microscope, as described above, may convert the visual representation of the specimen into a digital representation, and present that digital representation in the specimen display area 1930 via a touch sensitive display panel.

Image parameter control panel 1910 can provide functionality for a user to change the visual appearance of one or more image parameters of the specimen image including, for example, brightness controls 1912, contrast controls 1914, and color option selections 1916, among others. The image parameter control panel 1910 can also provide a file type selection functionality 1918 for a user to change a file type to be used for storage of a snapshot of the visual representation of the specimen.

The user may capture a snapshot of the visual representation of the specimen by activating a shutter button. For example, the interface 1900 can be presented on a touch-sensitive display panel in some embodiments, and a user may capture a snapshot of the visual representation of the specimen by touching a digital shutter button. For archiving, the interface 1900 may provide controls for naming the file 1925, naming the album 1930, and choosing which file type to save as (.jpeg, .tiff, .png) as described above. Such functionality can beneficially enable a user of the microscope to organize snapshots using a personalized system to enable easier retrieval of a desired specimen snapshot stored in an electronic database after storage, for example by naming the album based on session date, specimen type, or others, and by naming the files based on sample characteristics, image parameters, or the like, to name just a few examples.

Although not illustrated, the interface 1900 can provide for file sharing capabilities, for example enabling a user to send specimen snapshot images by email, directly upload to and interface with a local network server, or share using a networked file-sharing service. The interface 1900 can, in some embodiments, provide post processing tools for editing specimen snapshots after image capture, for example by cropping and making image parameter adjustments. The interface 1900 can also include analysis tools, for example for counting, labeling, rotating, and/or making measurements on captured specimen snapshots.

Overview of Additional Components of Rotating Embodiments

Figure 20A:
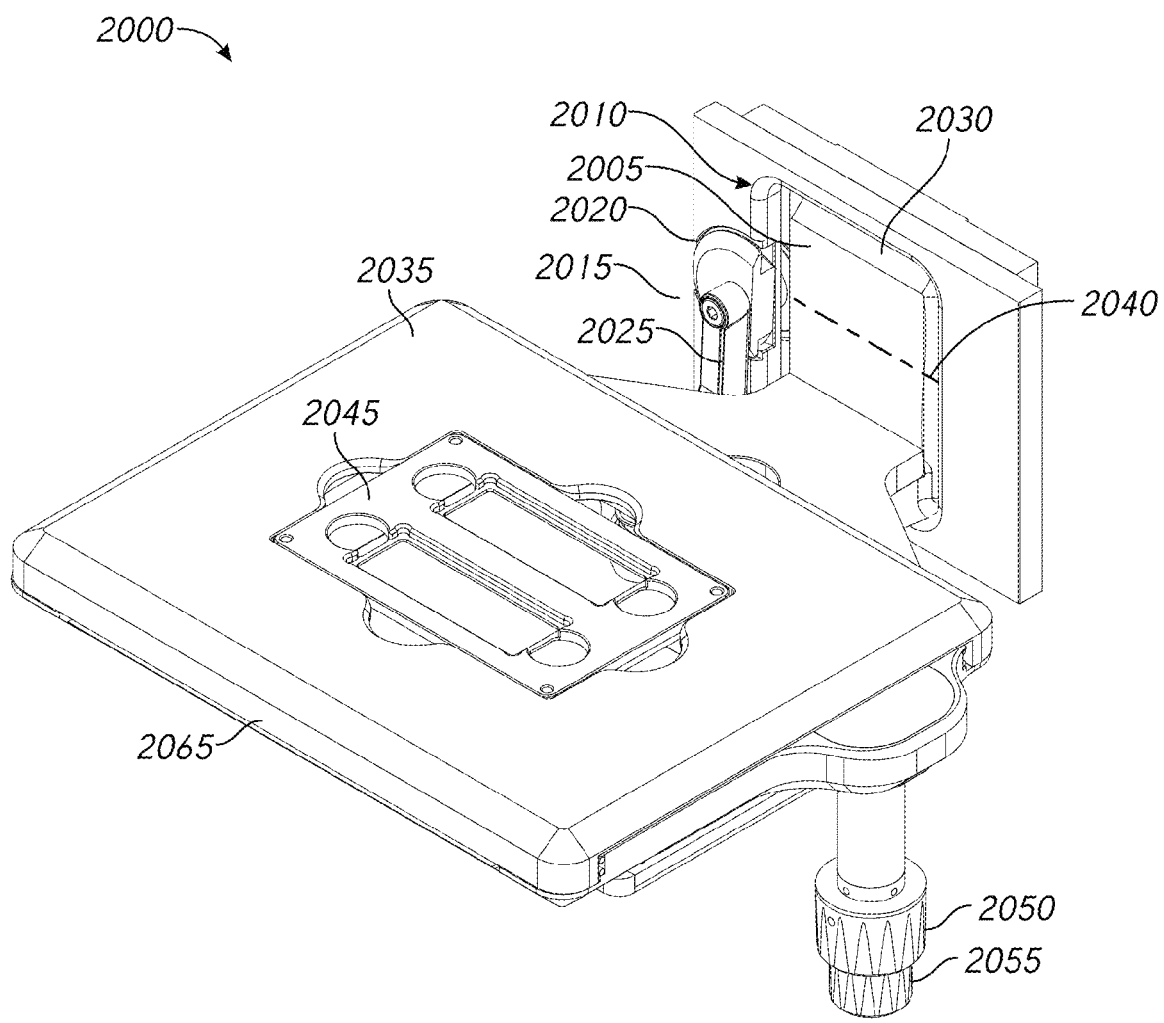
FIGS. 20A-20B illustrate an embodiment of a stage for use with a dual-configuration microscope.
Figure 20B:
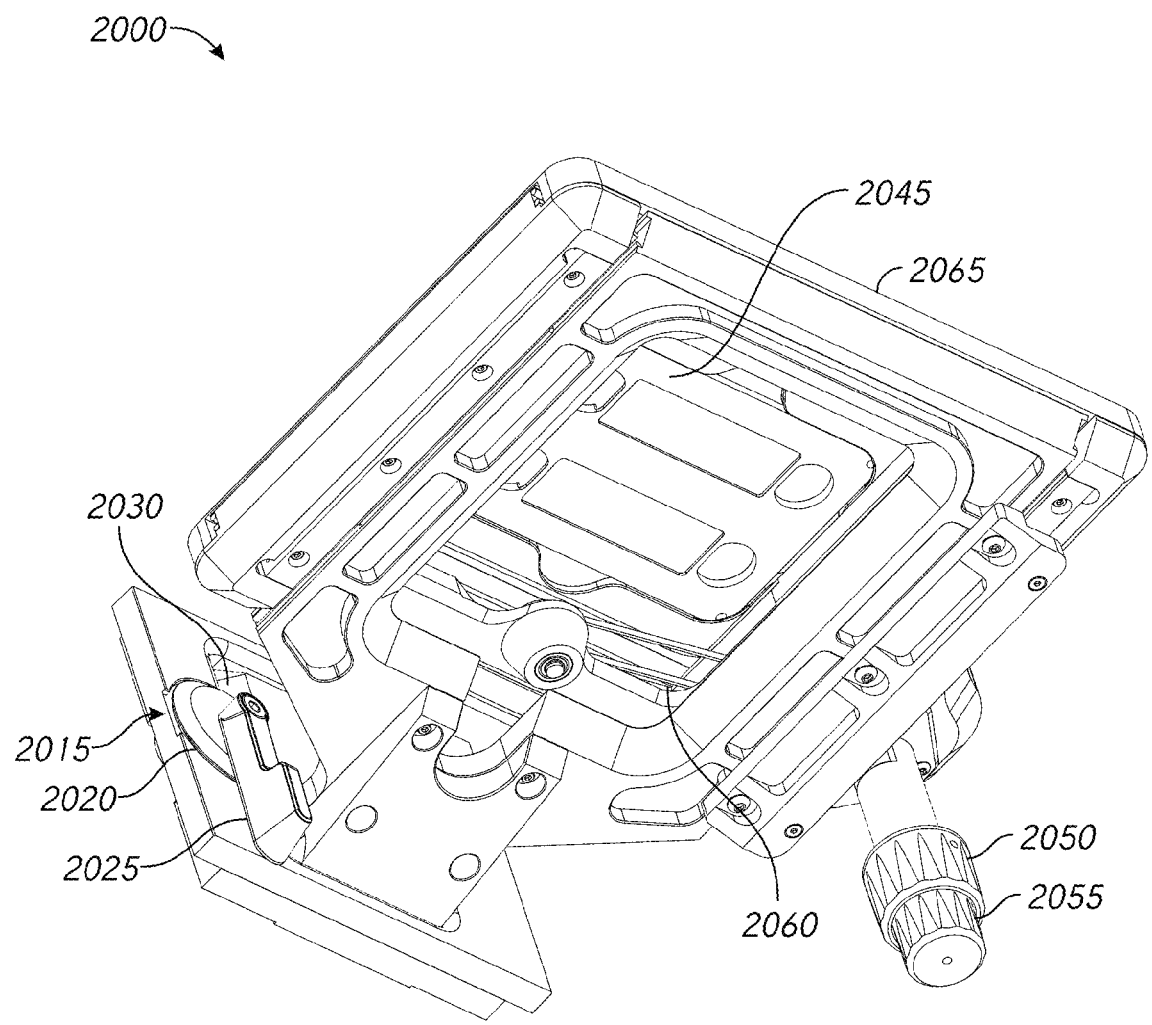

FIG. 20A illustrates a top, left, and front perspective view of a stage 2000 and FIG. 20B illustrates a bottom, right, and front perspective view of the stage 2000. As illustrated in FIGS. 20A-20B, an embodiment of an X-Y stage 2000 for use with a dual-configuration microscope such as is described herein may include a mounting block 2005 configured to be inserted into a corresponding pocket 2010 disposed within the intermediate portion 104C of the body of a dual-configuration microscope. In some embodiments, the X-Y stage 2000 can be used with any of the dual-configuration microscopes described herein, for example the rotatable microscope embodiments, modular microscope embodiments, and reconfigurable microscope embodiments discussed herein.

In the illustrated example, the mounting block 2005 of the stage 2000 can be inserted into the pocket 2010 and held into position by a quick release mechanism 2015. The quick release mechanism 2015 may comprise, in the illustrated embodiment, a chamfered rotating member 2020 and handle 2025, wherein the chamfered rotating member 2020 is configured to securely engage a corresponding chamfer 2030 on the mounting block 2005. As the quick release mechanism 2015 is rotated, a contact force between the chamfers 2020 and 2030 increases to thereby securely engage and maintain the mounting block 2005 in position. Other suitable releasable securing mechanisms can be used in other embodiments.

Figure 21A:
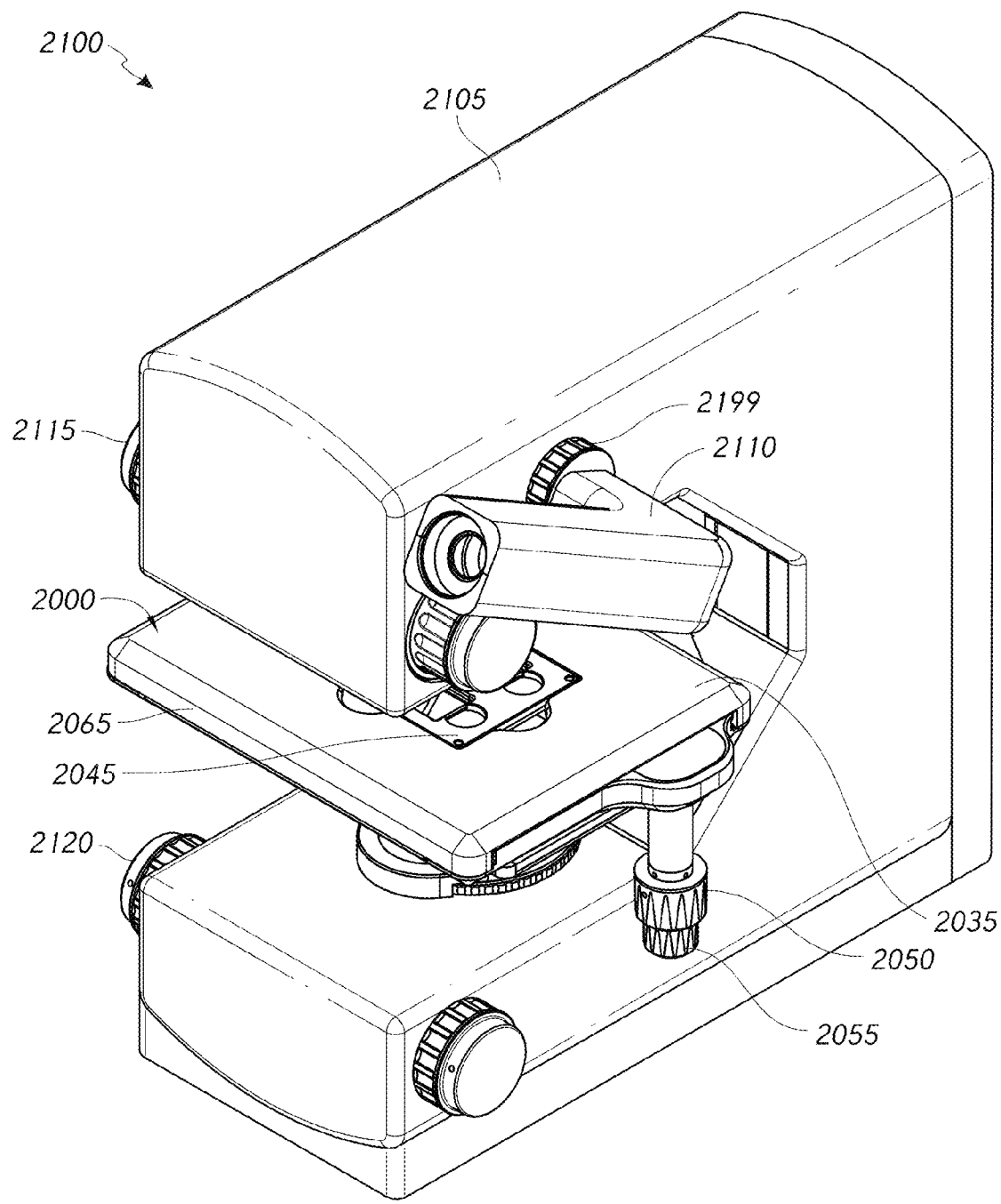
FIGS. 21A-21B illustrate an embodiment of a rotating microscope in an upright configuration.
Figure 21B:
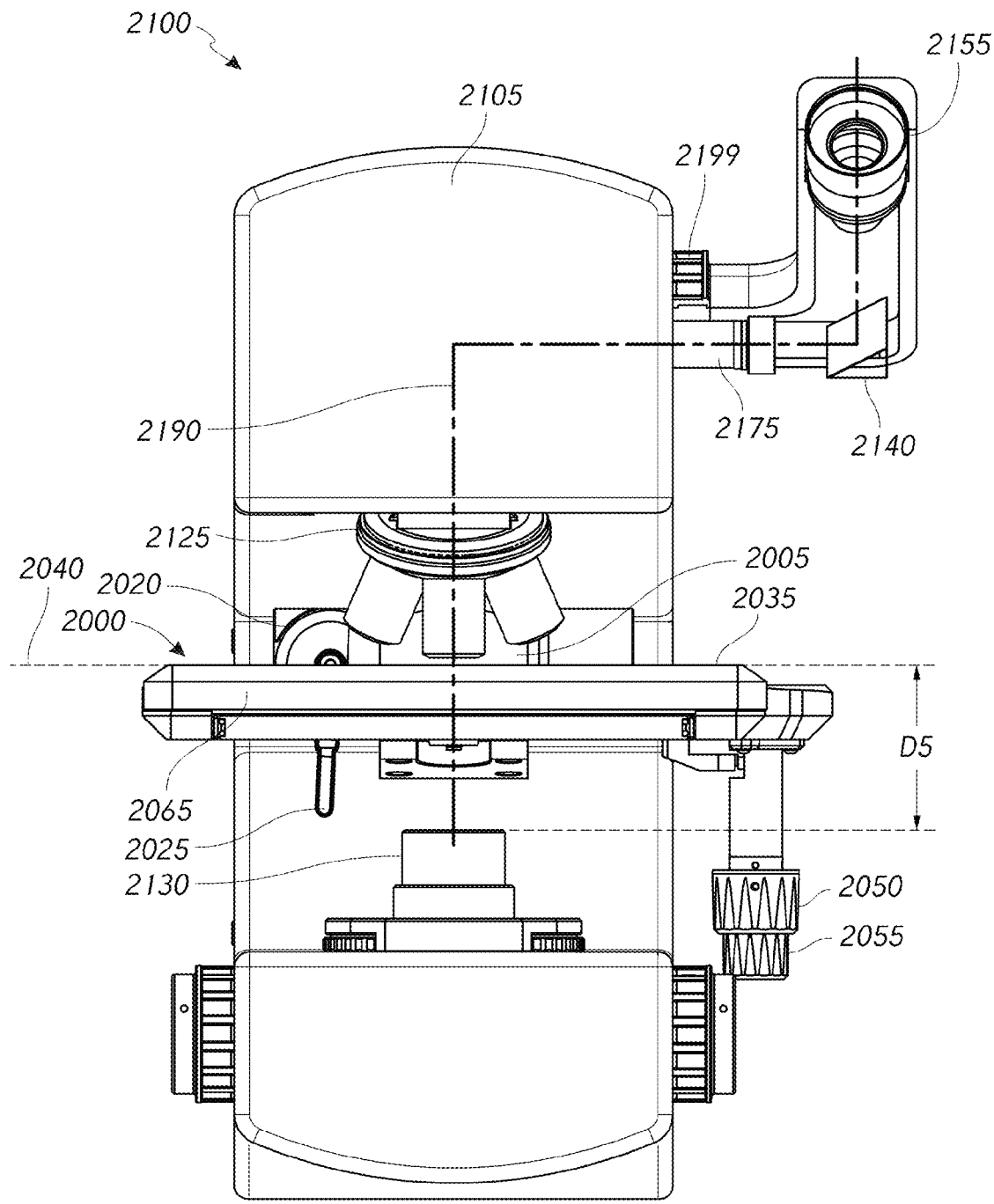
Figure 21C:
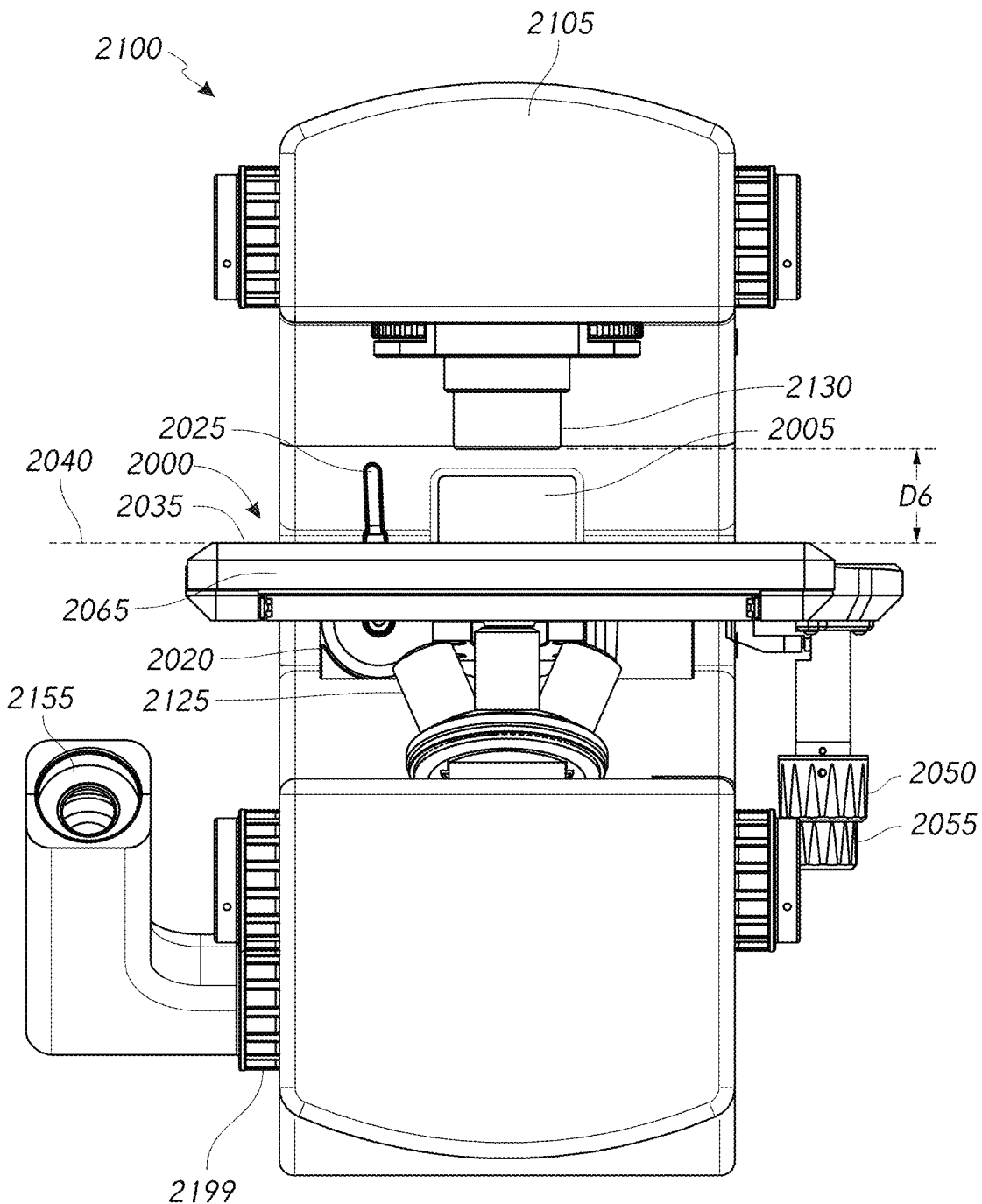
FIG. 21C illustrates an embodiment of the rotating microscope of FIGS. 21A-21B in an inverted configuration.

As illustrated in FIGS. 21B and 21C, the specimen supporting surface 2035 of the stage 2000 is mounted at or below a horizontal central axis 2040 of the mounting block 2005. The central axis 2040 of the mounting block 2005 passes through the vertical center of the mounting block 2005. In some aspects, the spatial relationship between the horizontal central axis 2040 of the mounting block 2005 and the specimen supporting surface 2035 enables a spacing between the specimen supporting surface 2035 of the stage 2000 and an outer surface of a lens of the objective and/or an outer surface of the condenser to be maintained, regardless of whether the microscope is in the upright or inverted configuration, as discussed above with reference to FIGS. 4A and 4B. To illustrate, when the microscope is in the upright configuration and after the stage 2000 is inserted into the pocket 2010 and secured, the specimen supporting surface 2035 is positioned a distance away from the outer surface of the lens of the objective 2125 and/or the outer surface of the condenser 2130 (represented by D5). When the microscope is in the inverted configuration and the stage 2000 is inserted into the pocket 2010 and secured, the specimen supporting surface 2035 is positioned substantially the same distance away from the outer surface of the lens of the objective 2125 and/or the outer surface of the condenser 2130 (represented by D6). Distances D5 and D6 may be equal or substantially equal. Thereby, the focal distance between the specimen supporting surface 2035 and outer surface of the lens of the objective can be maintained in some embodiments regardless of whether the microscope is in the upright or inverted configuration. In some embodiments, the spatial relationship between the horizontal central axis 2040 of the mounting block 2005 and the specimen supporting surface 2035 enables a spacing or working distance between the specimen supporting surface 2035 of the stage 2000 and an outer surface of a lens of the condenser 2130 of the microscope to be maintained regardless of whether the microscope is in the upright or inverted configuration.

As illustrated by FIG. 21B and FIG. 21C, the body of the microscope occupies substantially the same three-dimensional area in the inverted configuration and in the upright configuration, and faces substantially the same direction in the inverted configuration and in the upright configuration. In the inverted configuration, the objective occupies substantially the same space as the condenser occupies in the upright configuration. Similarly, in the inverted configuration, the condenser occupies substantially the same space as the objective occupies in the upright configuration. This can provide a seamless user experience when converting the microscope between the upright and inverted configurations, as the microscope occupies substantially the same space above the workspace upon which the microscope is placed in both configurations, and also faces the same direction in both configurations As in the illustrated embodiment, the stage 1900 can be configured to be removed during transition of the microscope between the inverted and upright configurations. In other embodiments, the stage 2000 and pocket 2010 can be coupled to the base of the microscope such that the body of the microscope can rotate between the inverted and upright configurations without removal of the stage 2000.

The illustrated specimen supporting surface 2035 of the stage 2000 includes an insert 2045 for holding two standard sized slides for an inverted microscope. In other embodiments, different slide inserts can be used instead of the illustrated insert 2045. The insert can be removable, and can be replaced with an insert for holding a specimen dish or container when the microscope is in the upright configuration.

The stage 2000 can be controlled in some embodiments by rotation of a Y-axis knob 2050 and an X-axis knob 2055 for driving belt 2060 for laterally positioning at least an upper structure 2065 of the stage 2000 in the Y and X directions, respectively, enabling acquisition of images of different portions of the samples supported by the insert 2045. Upper structure 2065 may comprise belts, gears, or other comparable mechanisms that enable at least the specimen supporting surface 2035 to move in the Y and X directions. In other embodiments, the stage 2000 can be additionally or alternatively controlled through use of a digital controller, for example through controller 1000 communicating with X and Y drive motors (not illustrated) of the stage 2000.

FIGS. 21A through 21C illustrate another embodiment of rotating microscope 2100 comprising a body rotatably coupled with a unitary base. The body 2105 includes at least one contoured surface. For example, the upper and lower surfaces of the body 2105 may each have a convex profile that corresponds to a concave profile of an outer surface of the lower portion of the base, facilitating smooth rotation of the body. FIG. 21A illustrates an isometric view of the microscope 2100 with the body in an upright configuration. The body 2100 includes the stage 2000 described above, and an optical arm 2110 with a rotatable collar 2199, a first geared focus module 2115 for the objective 2125, and a second geared focus module 2120 for the condenser 2130.

FIG. 21B illustrates a front view of the rotatable microscope 2100 in the upright configuration with the first geared focus module 2115 and a lower casing of the optical arm 2110 removed to reveal the components of the optical path 2190 inside of the optical arm 2110. The optical arm 2110 includes a rotatable collar 2199 and a Dove prism 2135 (shown in FIG. 21D) positioned to receive light representing acquired images and pass the light to the reflective surface 2140, which then redirects the light through the eyepiece 2155 of the optical arm 2110. The optical arm 2110 can be rotatably coupled to the body 2105 in some embodiments. Due to rotation of the optical arm 2110 around the optical path 2190 passing through the optical arm 2110, the acquired specimen image can be rotated when viewed by an imaging device in optical communication with the eyepiece 2155 of the optical arm 2110. Advantageously, the Dove prism 2135 is located in the optical path 2190 and can be longitudinal rotated, automatically and/or manually, in order to correct for rotation of the acquired image. For example, the Dove prism 2135 can be manually rotated in some embodiments by rotation of the collar 2199. FIG. 21C illustrates an embodiment of the rotatable microscope 2100 with the body positioned in an inverted configuration.

Figure 21D:
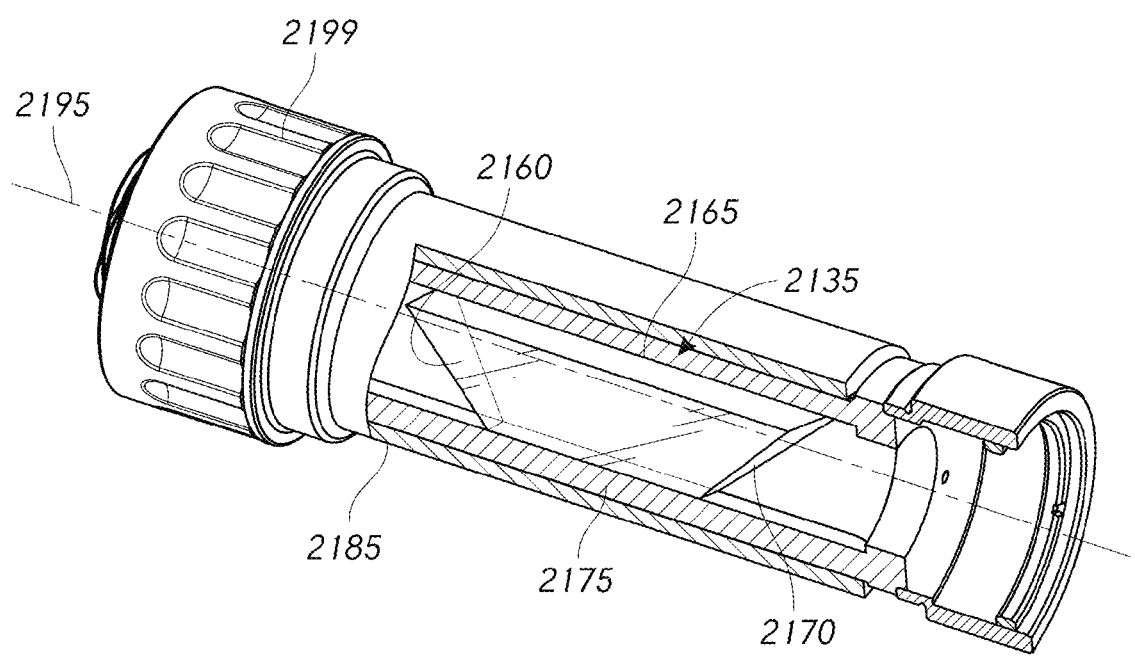
FIG. 21D illustrates an embodiment of a Dove prism housing.

FIG. 21D illustrates a close up view of the Dove prism 2135 within a housing 2175. The housing 2175 may rotate at a different rate than the optical arm 2110 in some embodiments. The Dove prism 2135 is a type of reflective prism which can be used to invert an image. The Dove prism 2135 is shaped from a truncated right-angle prism. A beam of light entering a first face 2160 of the sloped faces of the prism undergoes total internal reflection from the inside of the longest face 2165 and emerges from the opposite sloped face 2170. Images passing through the prism 2135 are flipped, and because only one reflection takes place, the image is inverted but not laterally transposed. Properties of the Dove prism 2135 make it useful as a beam rotator, as when the prism 2135 is rotated along its longitudinal axis 2195, the transmitted image rotates at twice the rate of the prism 2135. Accordingly, longitudinal rotations of the prism 2135 can cause double the rotation of the acquired image to correct for rotation of visual representations of specimens due to rotation of the microscope and/or optical arm. The longitudinal axis 2195 of the Dove prism 2135 can be aligned with the optical path 2190 in some embodiments.

In some embodiments, the Dove prism 2135 is disposed within the housing 2175 comprising an inner tube, the inner tube 2175 is disposed within an outer tube 2185. The inner tube 2175 and outer tube 2185 are coaxially arranged. Rotation of the inner tube 2175 can be accomplished by rotation of a collar 2199 that may be disposed at substantially one end of the inner tube 2175. In some aspects, the collar 2199 may be coupled to the inner tube 2175 via a threaded engagement, press fit, or other comparable mechanical coupling methods know to a person of ordinary skill. Rotation of the collar 2199 thereby causes rotation of the inner tube 2175, which in turn causes rotation of the Dove prism 2135. Additionally or alternatively, the Dove prism 2135 may be rotated automatically with the use of gears that are arranged to rotate the inner tube 2175 as the optical arm 2110 is rotated. As one example, the gears may be arranged to provide a gearing ratio of 2:1, where one full rotation of the optical arm 2110 causes one-half rotation of the Dove prism 2135. Other gearing ratios may be acceptable, depending on the intended design. In other aspects, a user may further manually rotate the inner tube 2175 to attain a desired rotation of the acquired image. In other aspects, rotation of the Dove prism 2135 may be accomplished via a stepper, rotational, or linear motor, for example, driven by controller 1000. In yet another example, a stepper, rotational, or linear motor may be actuated based on an accelerometer reading of the electronic device coupled to the optical arm 2110.

In some embodiments, the Dove prism 2135 as described above can be used with any of the dual-configuration microscopes described herein, for example the rotatable microscope embodiments, modular microscope embodiments, and reconfigurable microscope embodiments discussed herein.

Terminology

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A microscope comprising:
   a base;
   a body comprising a first portion and a second portion, wherein the body is rotatably coupled to the base at a rotational coupling;
   one or more objectives coupled to the first portion of the body;
   a condenser coupled to the second portion of the body;
   a stage positioned between the one or more objectives and the condenser, and comprising a first specimen supporting surface and a second specimen supporting surface, wherein the second specimen supporting surface is positioned opposite the first specimen supporting surface;
   wherein the one or more objectives, the condenser, and the stage are positioned in an inverted configuration when the body is positioned such that the one or more objectives is located below a light source and the second specimen supporting surface is oriented to support a specimen; and
   wherein the one or more objectives, the condenser, and the stage are positioned in an upright configuration when the body is positioned such that the one or more objectives is located above the light source and the first specimen supporting surface is oriented to support a specimen.

2. The microscope of claim 1, wherein the stage further comprises:
   a first specimen securing element coupled to the first specimen supporting surface; and
   a second specimen securing element coupled to the second specimen supporting surface.

3. The microscope of claim 1, wherein the first specimen supporting surface and the second specimen supporting surface both include a recessed pocket.

4. The microscope of claim 1 further comprising:
   a handle removably coupled to the stage, wherein the distal portion of the handle is configured to engage a first receptacle located on the first specimen supporting surface and a second receptacle located on the second specimen supporting surface.

5. The microscope of claim 4, wherein the handle is magnetically coupled to the stage.

6. A microscope system comprising:
   a body comprising a first portion and a second portion, wherein the body is rotatably coupled to a base at a rotational coupling, the rotational coupling defining a rotating axis;
   one or more objectives coupled to the first portion of the body;
   a condenser coupled to the second portion of the body; and
   a stage positioned between the one or more objectives and the condenser, and comprising a first specimen supporting surface and a second specimen supporting surface, wherein the second specimen supporting surface is positioned opposite the first specimen supporting surface.

7. The microscope system of claim 6, wherein the stage further comprises a first specimen securing element coupled to the first specimen supporting surface.

8. The microscope system of claim 6, wherein the stage further comprises a second specimen securing element coupled to the second specimen supporting surface.

9. The microscope system of claim 6, wherein the first specimen supporting surface includes a first recessed pocket.

10. The microscope of claim system of claim 6, wherein the second specimen supporting surface includes a second recessed pocket.

11. The microscope system of claim 6 further comprising:
a handle removably coupled to the stage, wherein the distal portion of the handle is configured to engage a first receptacle located on the first specimen supporting surface and a second receptacle located on the second specimen supporting surface.

12. A method for assembling a rotating microscope, the method comprising:
coupling a microscope body to a microscope base at a rotational coupling, the microscope body configured to rotate about a rotating axis of the rotational coupling;
coupling one or more objectives to a first portion of the microscope body;
coupling a condenser to a second portion of the microscope body; and
mounting a stage between the one or more objectives and the condenser, the stage comprising a first specimen supporting surface and a second specimen supporting surface, wherein the first specimen supporting surface is positioned opposite the second specimen supporting surface.

* * * * *